Figure 1:
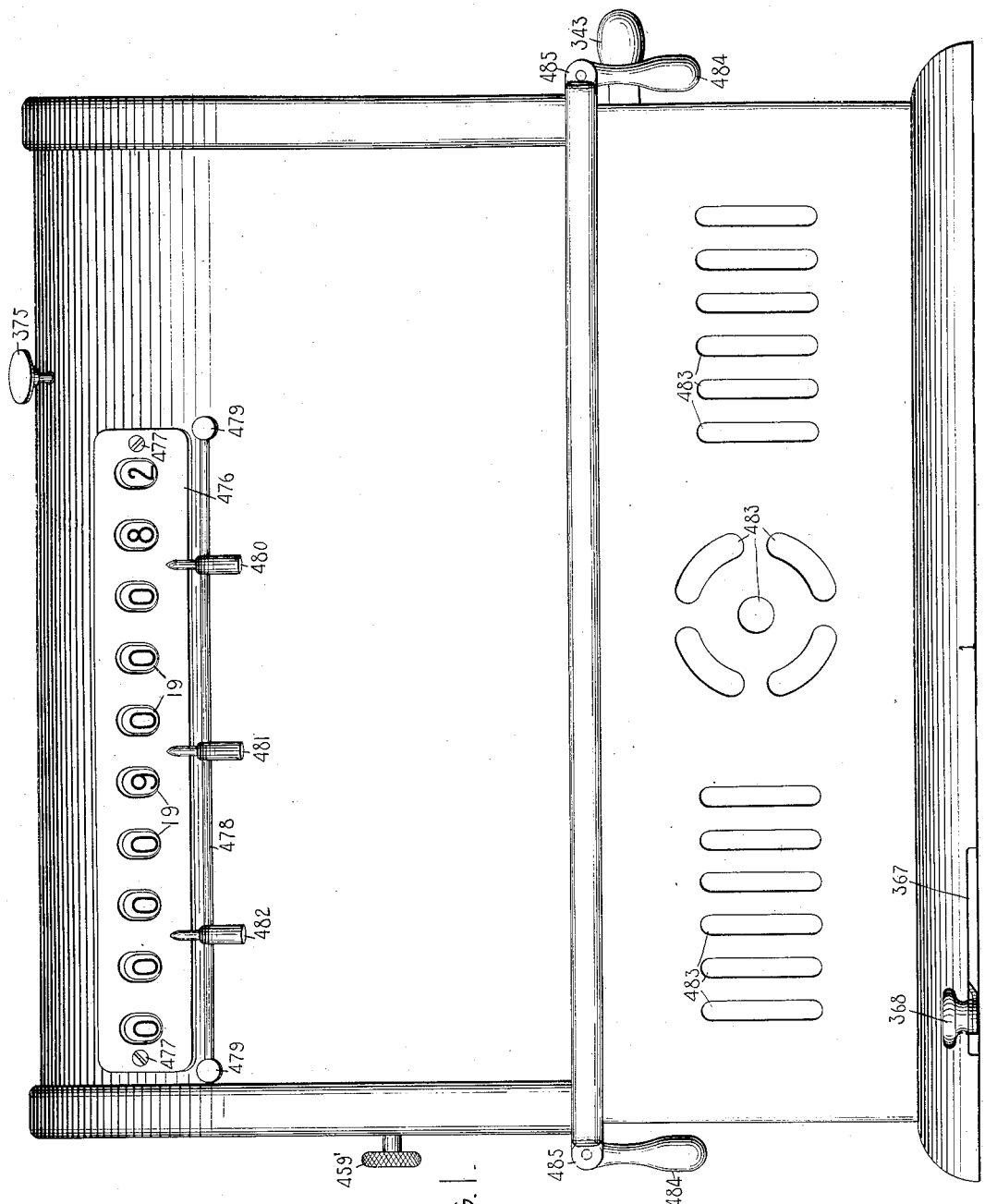

No. 852,016. PATENTED APR. 30, 1907.
A. H. ELLIS.
COMBINED TYPE WRITING AND ADDING MACHINE.
APPLICATION FILED OCT. 2, 1903.

20 SHEETS—SHEET 2.

WITNESSES:
R. H. Strother
K. V. Donovan

INVENTOR.
Albert H. Ellis
by Jacob Felbel
HIS ATTORNEY

No. 852,016. PATENTED APR. 30, 1907.
A. H. ELLIS.
COMBINED TYPE WRITING AND ADDING MACHINE.
APPLICATION FILED OCT. 2, 1903.

20 SHEETS—SHEET 3.

WITNESSES:
R.H.Strother
K.V.Donovan.

INVENTOR:
Albert H. Ellis
by Jacob Felbel
HIS ATTORNEY

No. 852,016. PATENTED APR. 30, 1907.
A. H. ELLIS.
COMBINED TYPE WRITING AND ADDING MACHINE.
APPLICATION FILED OCT. 2, 1903.

20 SHEETS—SHEET 6.

WITNESSES:
R. H. Strother
K. V. Donovan

INVENTOR:
Albert H. Ellis
by Jacob Felbel
HIS ATTORNEY

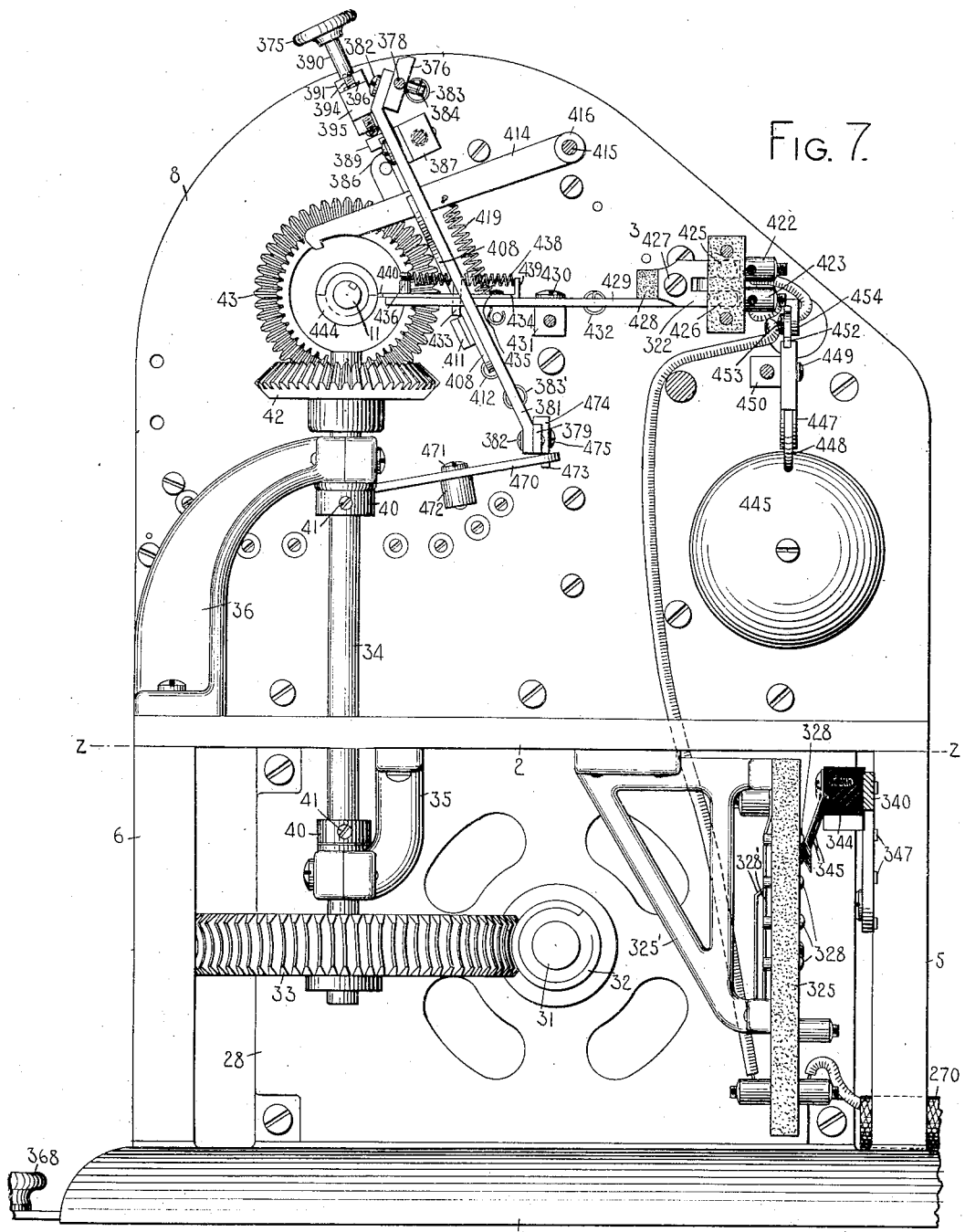

No. 852,016. PATENTED APR. 30, 1907.
A. H. ELLIS.
COMBINED TYPE WRITING AND ADDING MACHINE.
APPLICATION FILED OCT. 2, 1903.
20 SHEETS—SHEET 8.
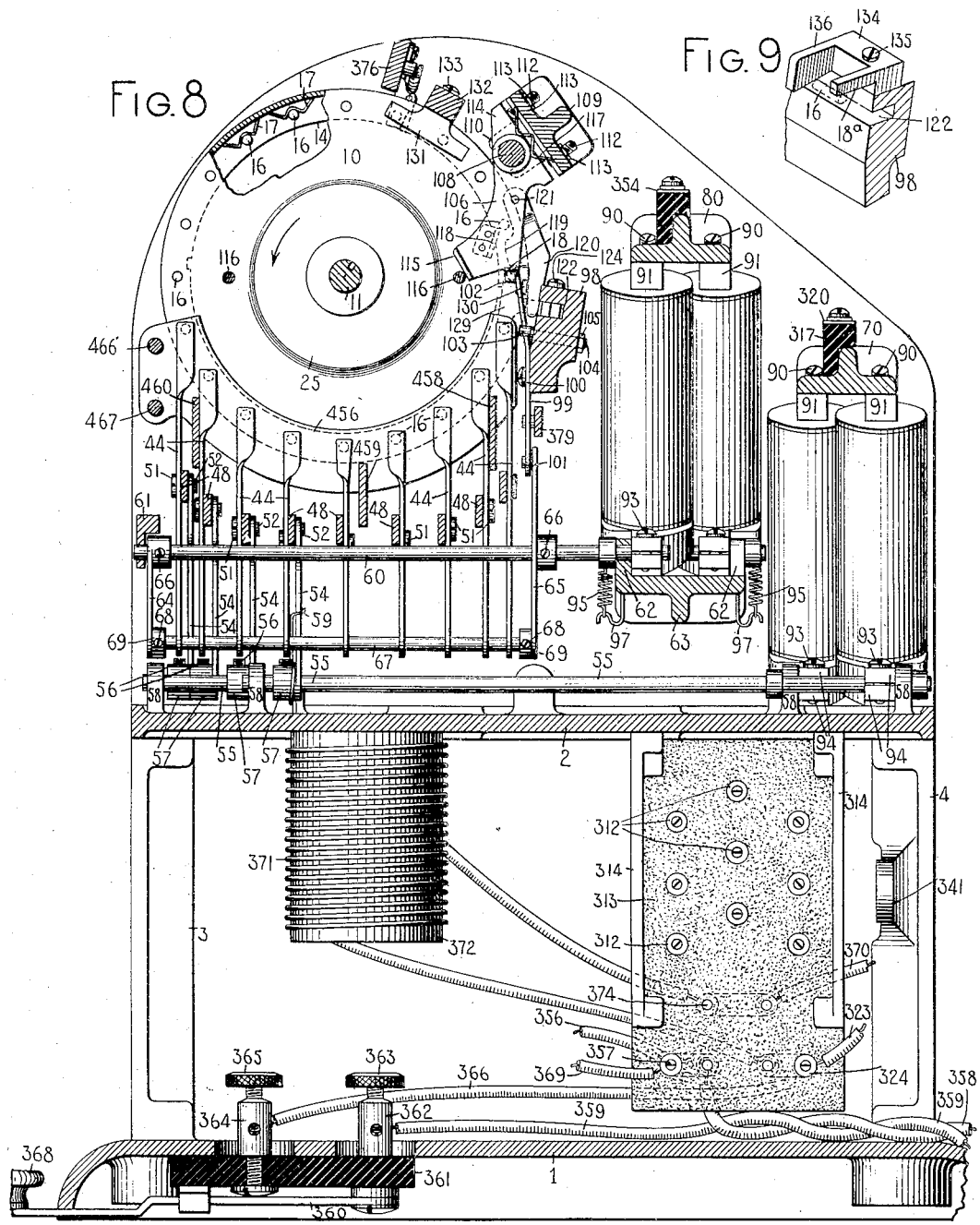
WITNESSES:
R. H. Strother
K. V. Donovan
INVENTOR:
Albert H. Ellis
by Jacob Felbel
HIS ATTORNEY

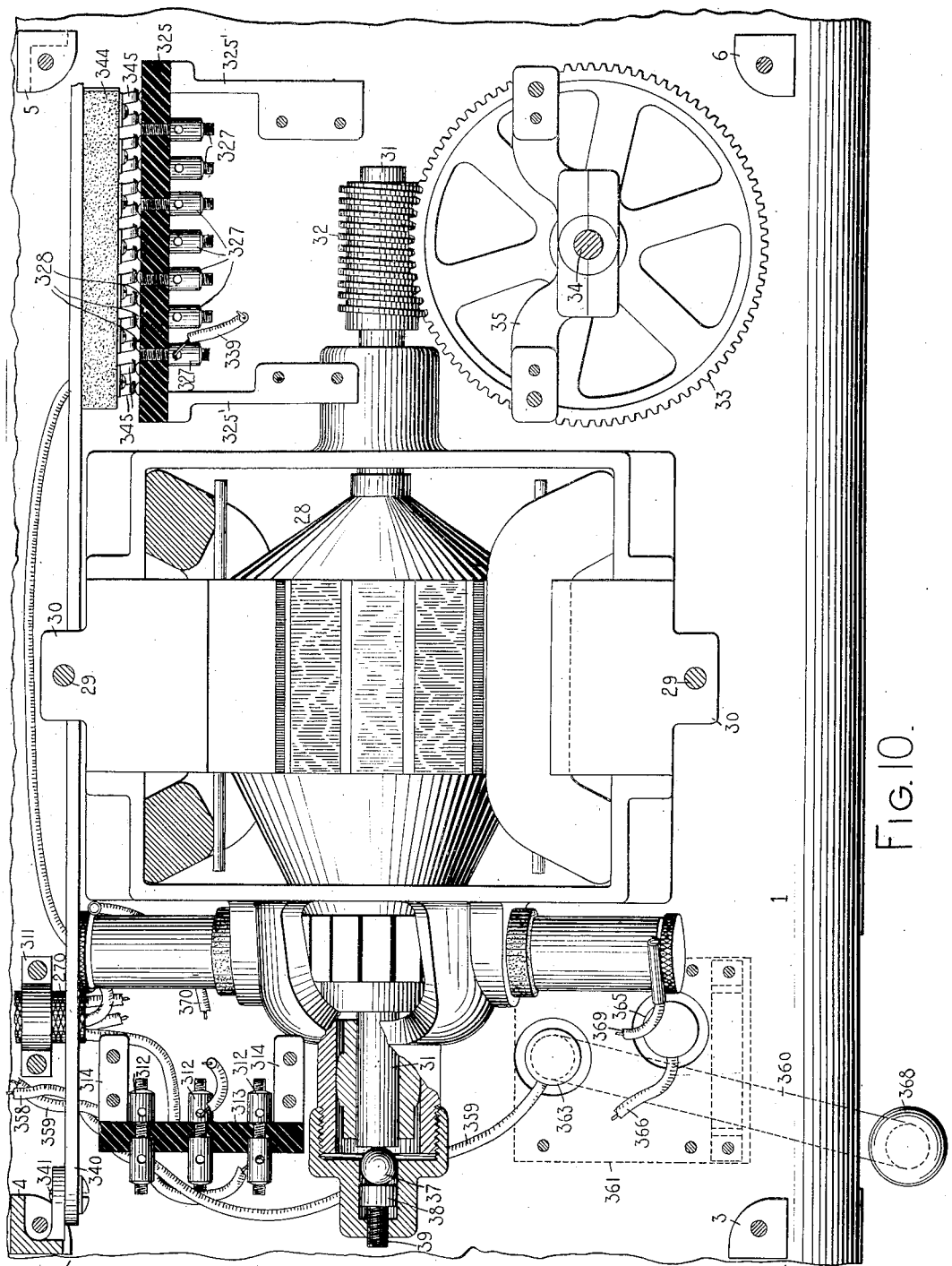

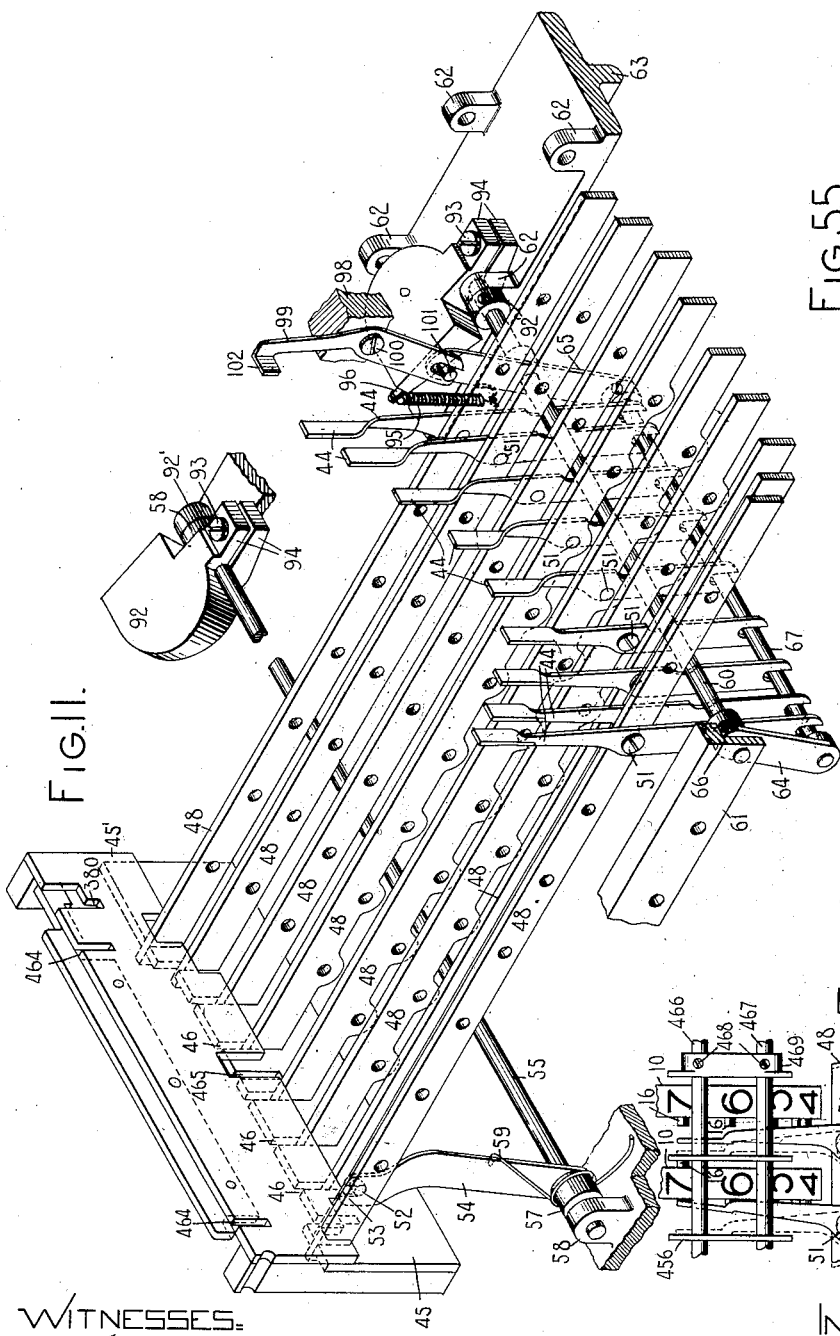

No. 852,016. PATENTED APR. 30, 1907.
A. H. ELLIS.
COMBINED TYPE WRITING AND ADDING MACHINE.
APPLICATION FILED OCT. 2, 1903.
20 SHEETS—SHEET 11.
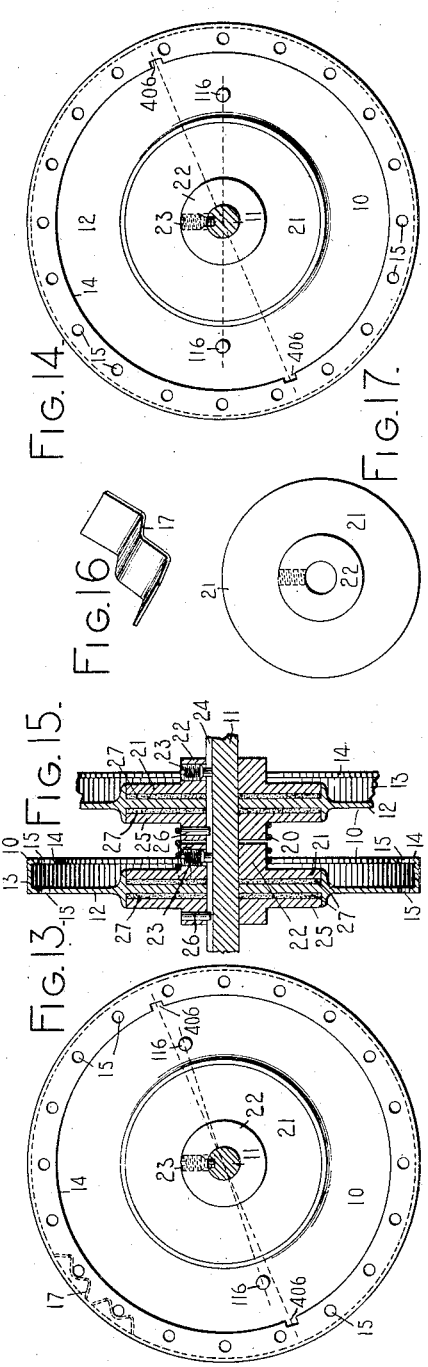
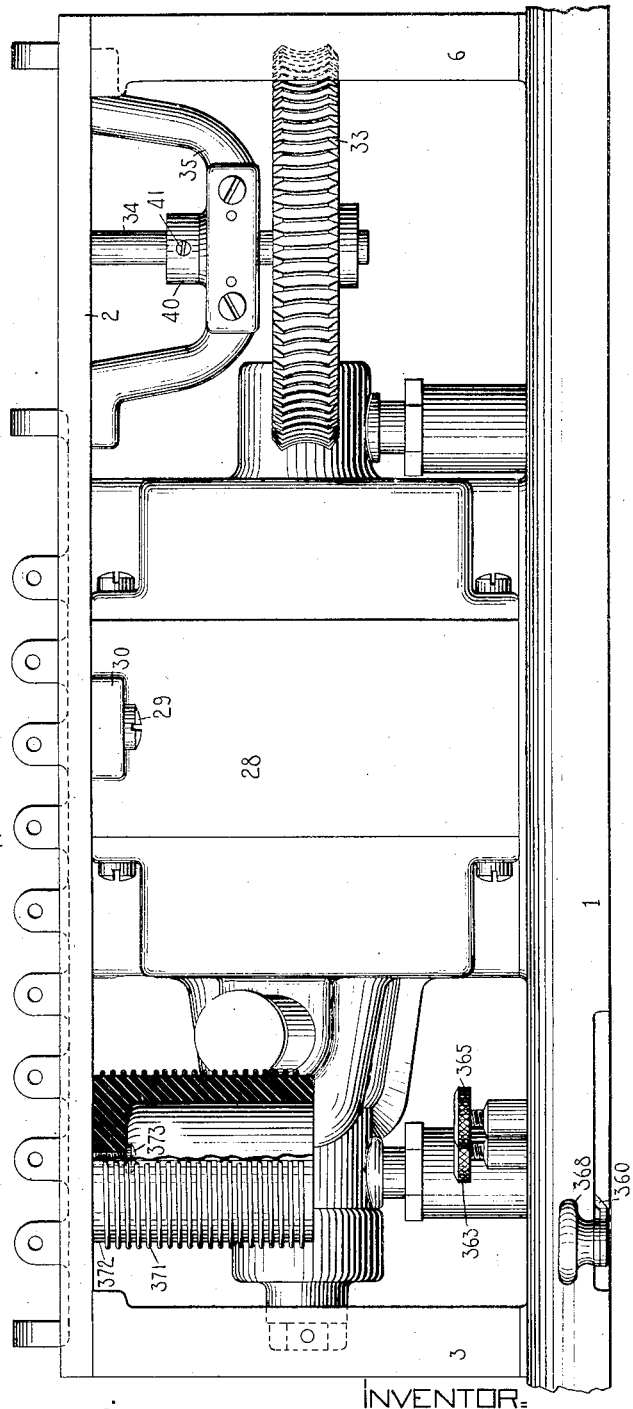
WITNESSES:
R. H. Strother
K. V. Donovan
INVENTOR:
Albert H. Ellis
by Jacob Felbel
HIS ATTORNEY

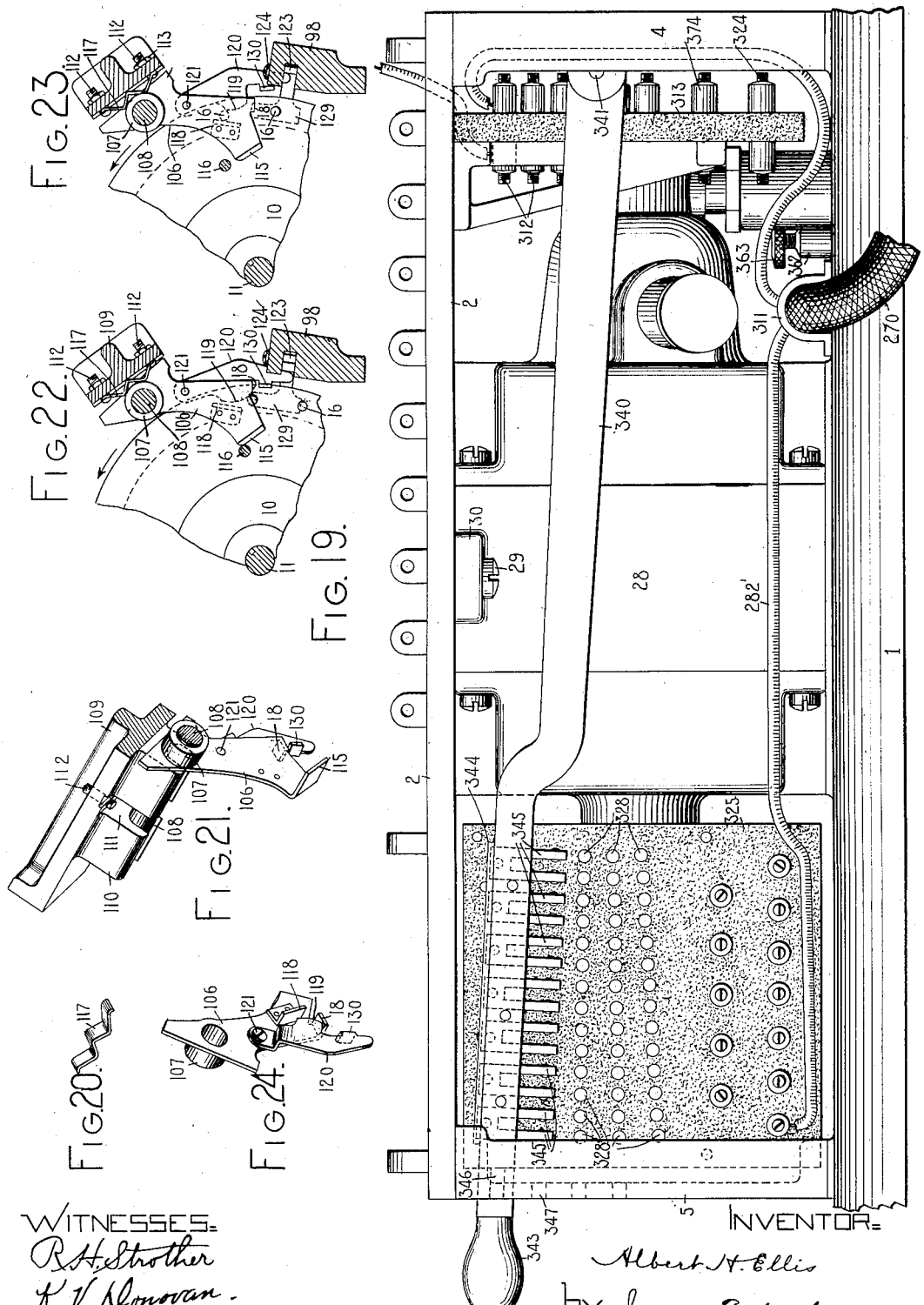

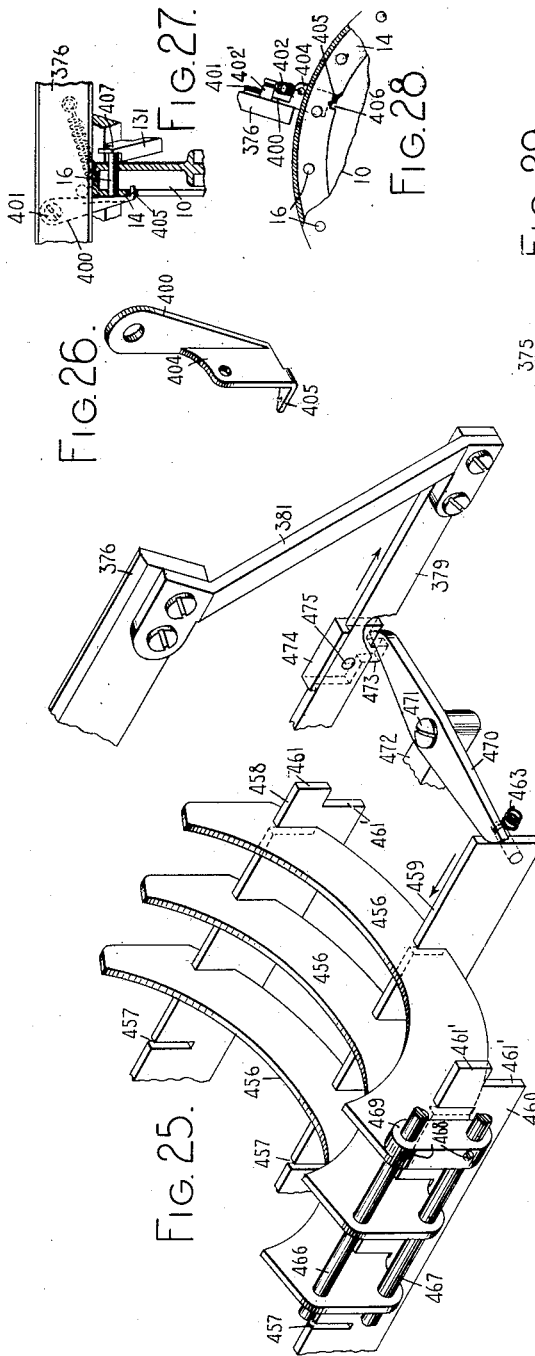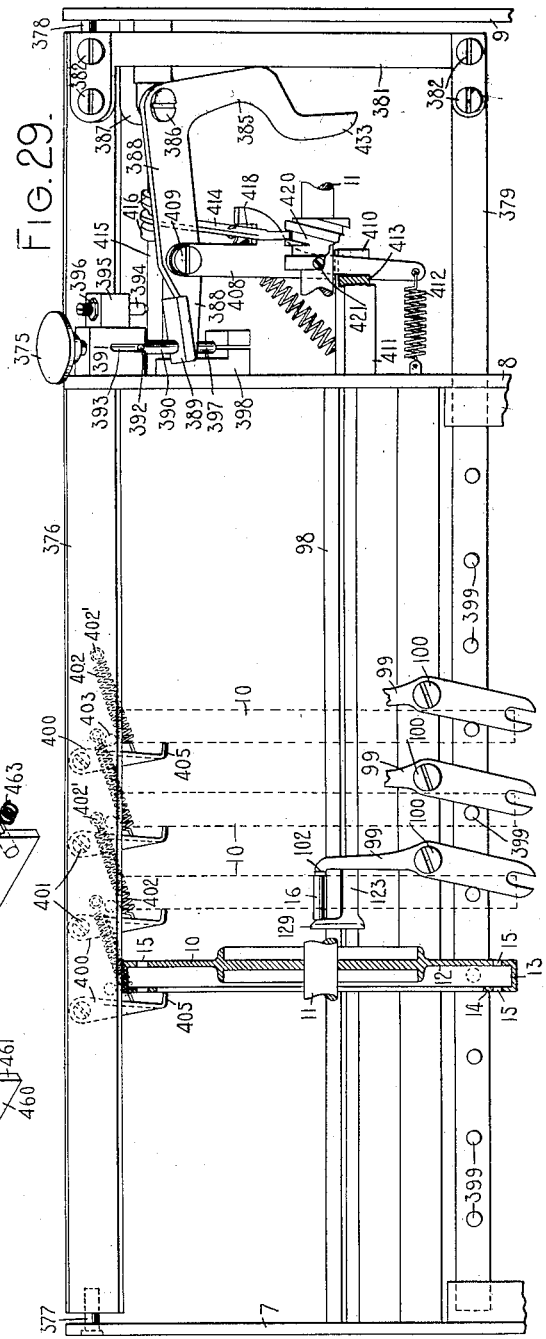

No. 852,016. PATENTED APR. 30, 1907.
A. H. ELLIS.
COMBINED TYPE WRITING AND ADDING MACHINE.
APPLICATION FILED OCT. 2, 1903.
20 SHEETS—SHEET 14.
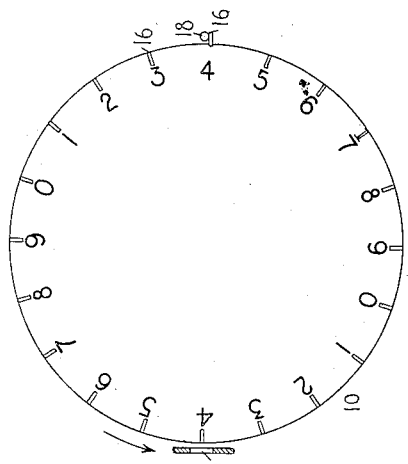
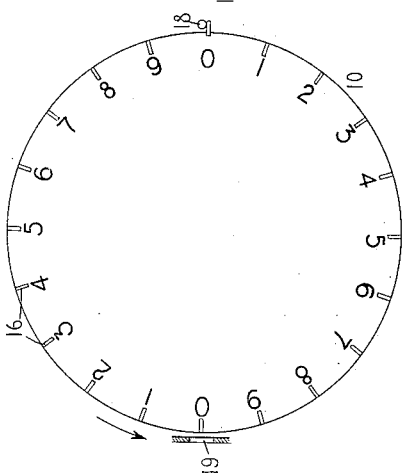
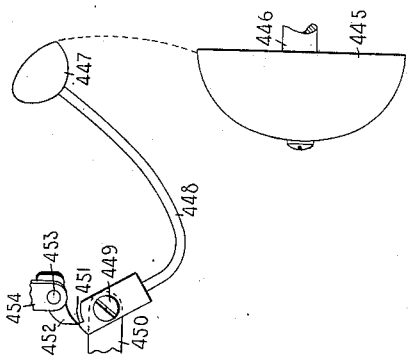
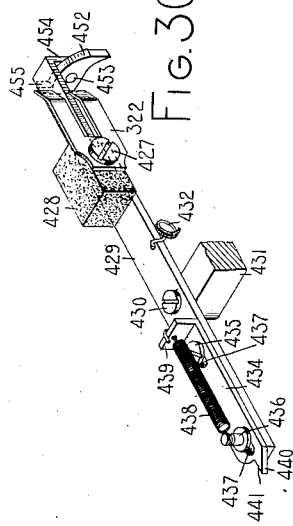
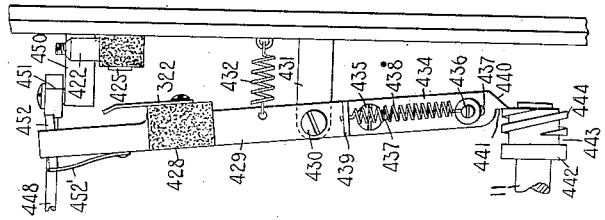
WITNESSES:
R H Strother
K V Dawran
INVENTOR:
Albert H. Ellis
by Jacob Felbel
HIS ATTORNEY No. 852,016. PATENTED APR. 30, 1907.
A. H. ELLIS.
COMBINED TYPE WRITING AND ADDING MACHINE.
APPLICATION FILED OCT. 2, 1903.
20 SHEETS—SHEET 15.
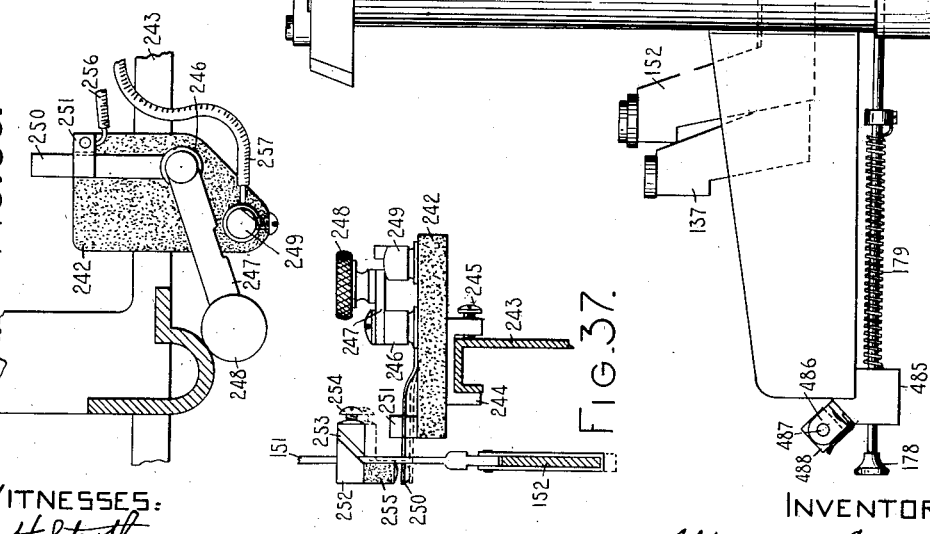
WITNESSES:
R. H. Strother
K. V. Donovan.
INVENTOR:
Albert H. Ellis
by Jacob Felbel
HIS ATTORNEY

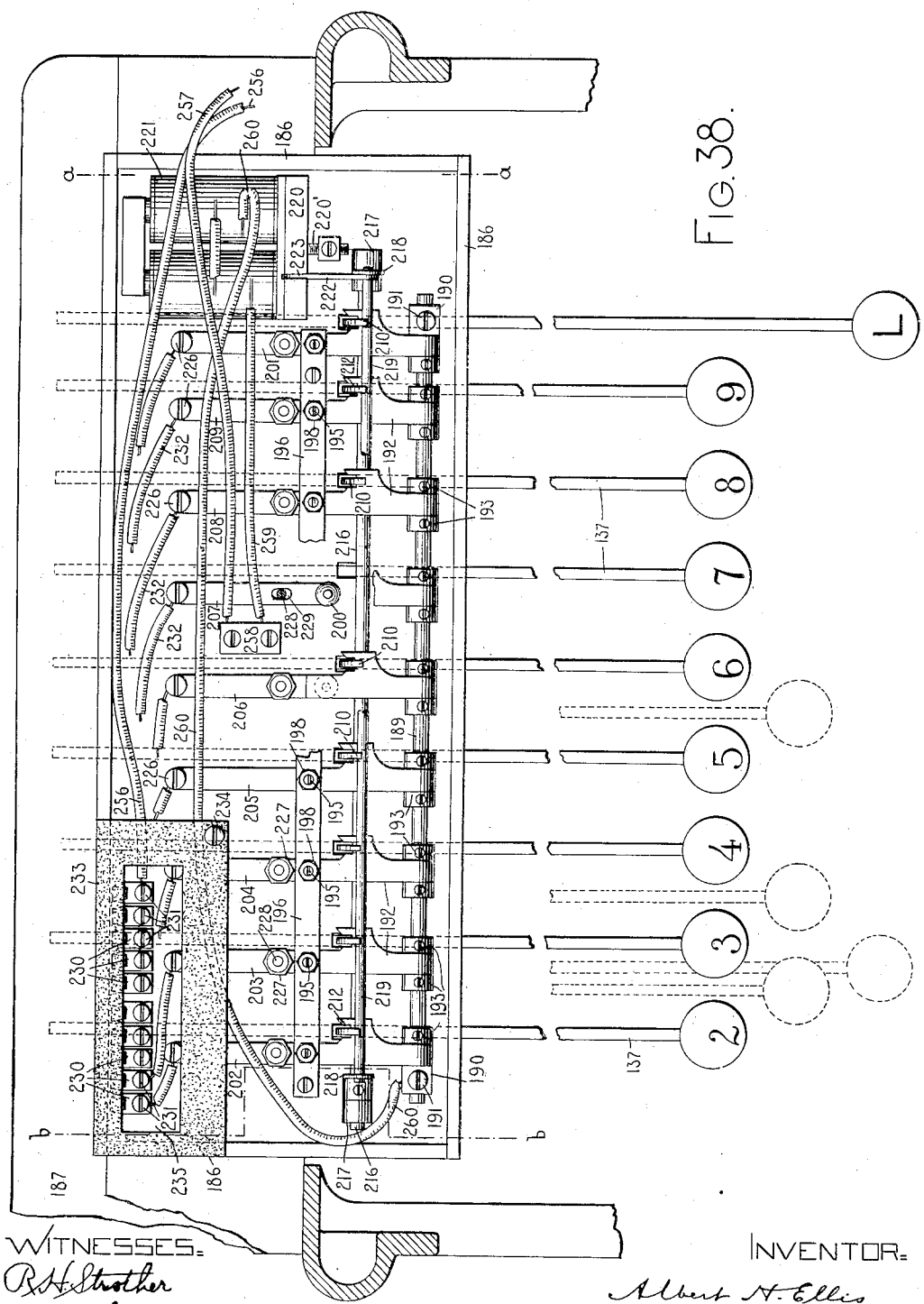

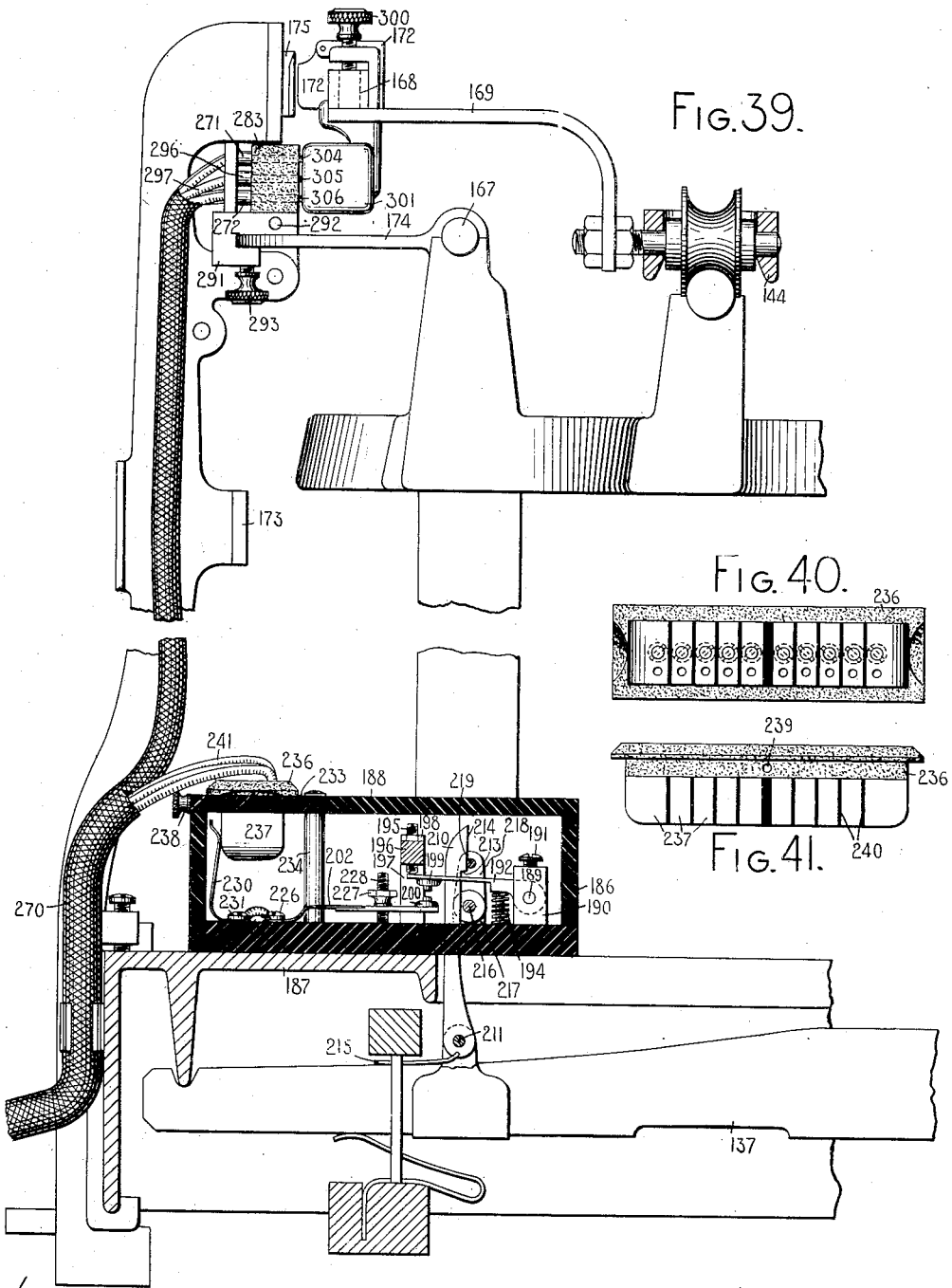

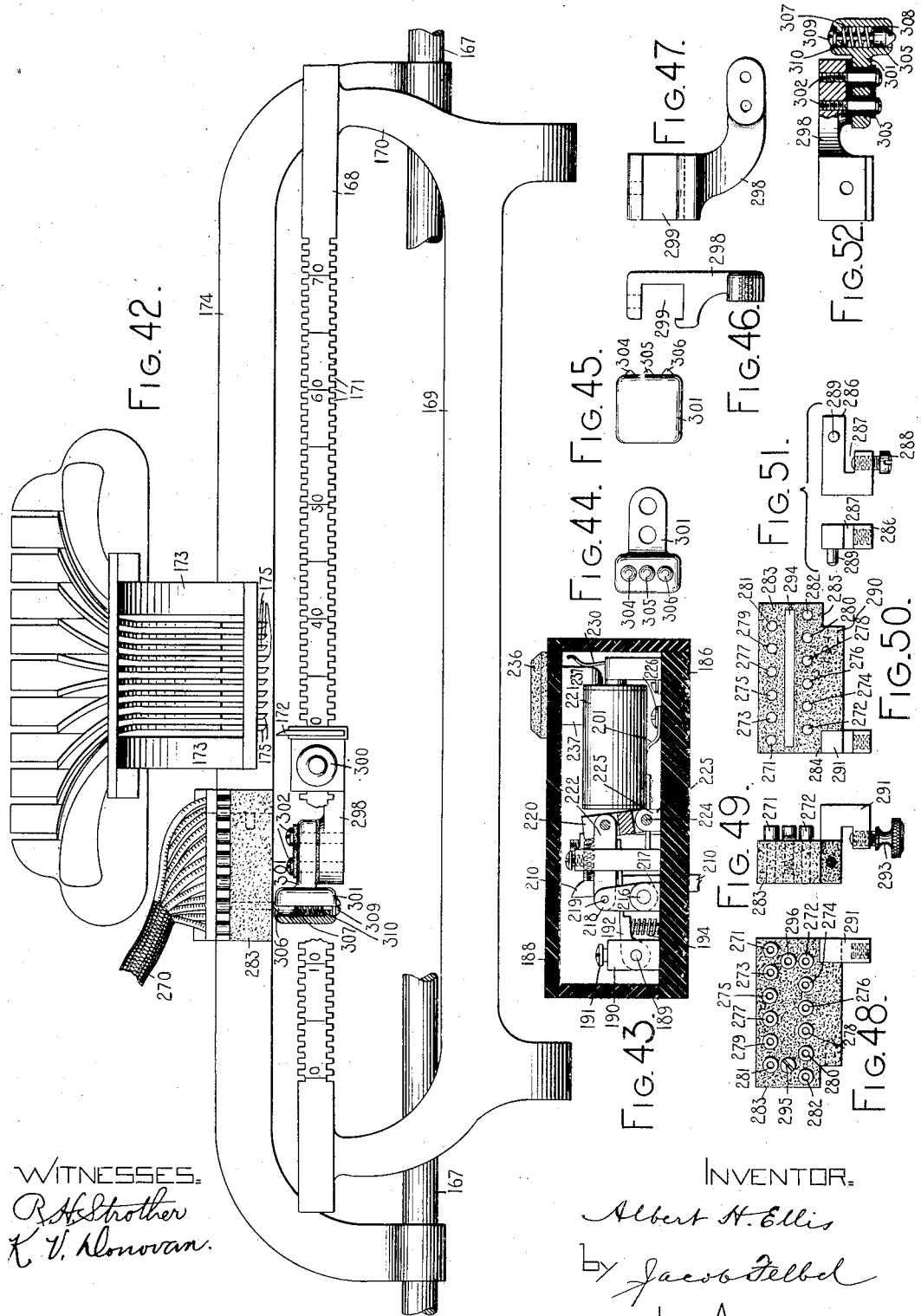

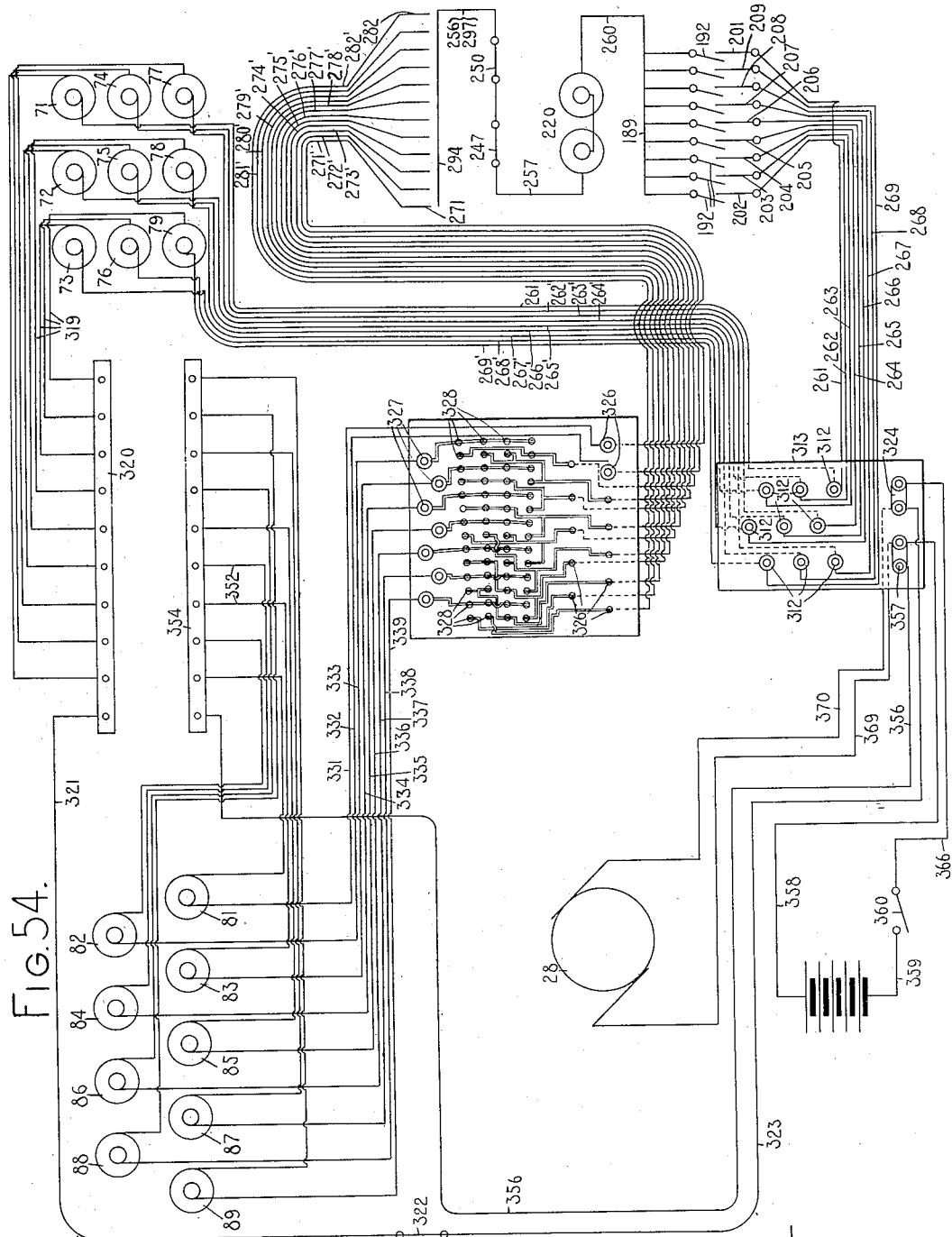

UNITED STATES PATENT OFFICE.

ALBERT H. ELLIS, OF NEW YORK, N. Y., ASSIGNOR TO WYCKOFF, SEAMANS & BENEDICT, OF ILION, NEW YORK, A CORPORATION OF NEW YORK.

COMBINED TYPE-WRITING AND ADDING MACHINE.

No. 852,016.             Specification of Letters Patent.          Patented April 30, 1907.

Application filed October 2, 1903. Serial No. 175,457.

*To all whom it may concern:*

Be it known that I, ALBERT H. ELLIS, a citizen of the United States, and a resident of the borough of Manhattan, city of New York, in the county of New York and State of New York, have invented certain new and useful Improvements in Combined Type-Writing and Adding Machines, of which the following is a specification.

My invention relates principally to adding machines.

My invention relates also to combined typewriting and adding machines.

My invention has for its principal object to provide a practical device for automatically adding numbers written or printed on an ordinary typewriting machine, which device shall not interfere with or modify the operation of the typewriting machine as such, in any way whatever. In carrying out this and other objects, I have devised novel adding mechanism, novel means whereby an adding mechanism is controlled by the mechanism of a typewriting machine and numerous features of construction and combinations, both mechanical and electrical, all of which will be fully set forth herein.

My invention consists in certain features of construction and in certain combinations which will be particularly pointed out in the claims at the conclusion of this specification.

In order that my invention may be understood, I have illustrated one embodiment thereof in detail, but it will readily be perceived that many features here shown and described are capable of wide modification, and many of the present combinations are capable of use in other relations.

Some of the features shown in the present case are not claimed herein, such features forming the subject-matter of other applications co-pending herewith.

In an adding attachment to a typewriting machine, the following requirements have seemed to me to be important:—

1st. The adding attachment must operate without affecting the keys of the typewriter in any manner. It is important that any attachment to a typewriter shall not interfere with the touch of the keys; that is to say, shall not modify the amount of force required to depress the keys. Moreover, such an attachment should not interfere with the speed of the key action. Typewriter operators are taught a staccato stroke on the keys and a practical adding attachment should be capable of operation by such a stroke.

2nd. It must operate without affecting the operation of the typewriter carriage in any way. The operators of typewriting machines have grown accustomed to a certain amount of resistance to be overcome in returning the carriage to its starting position and the adding attachment should not appreciably modify this resistance, nor should it affect the movement of the carriage in any other way.

3rd. It must be adapted to be set to operate at any portion of the line of writing.

4th. It must not in any way interfere with the ordinary use of the typewriter when the latter is used for the common purposes of writing.

5th. It must be an attachment pure and simple and require no changes in the typewriter to attach it.

6th. It must be adjustable with regard to spacing for punctuation so that commas or decimal points may be left between denominations if desired.

7th. It must be entirely automatic in its operation so that the operator will not have anything more to do nor anything more to think about when the adding machine is in operation than he has when said machine is not in use.

The present machine is the first of which I am aware that meets these very exacting requirements.

Figure 2:
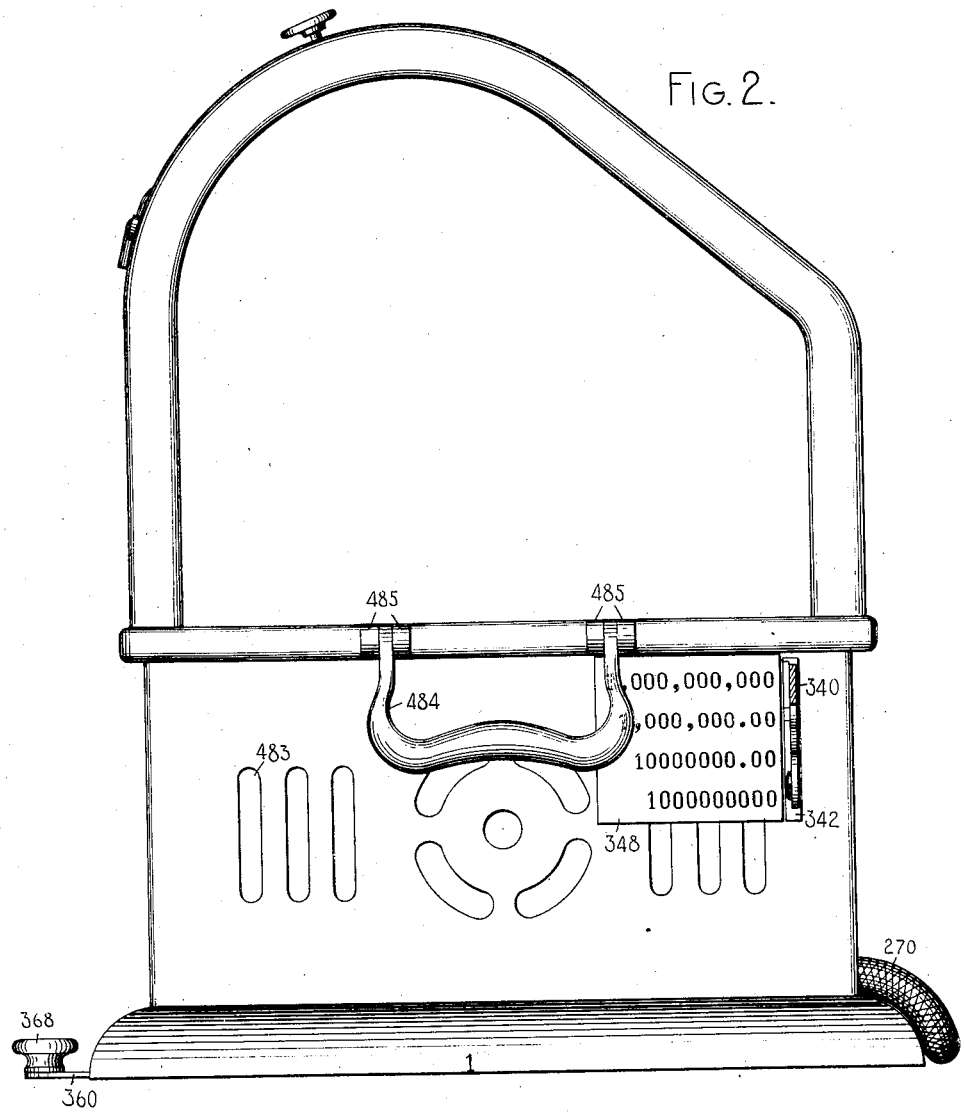
Figure 3:
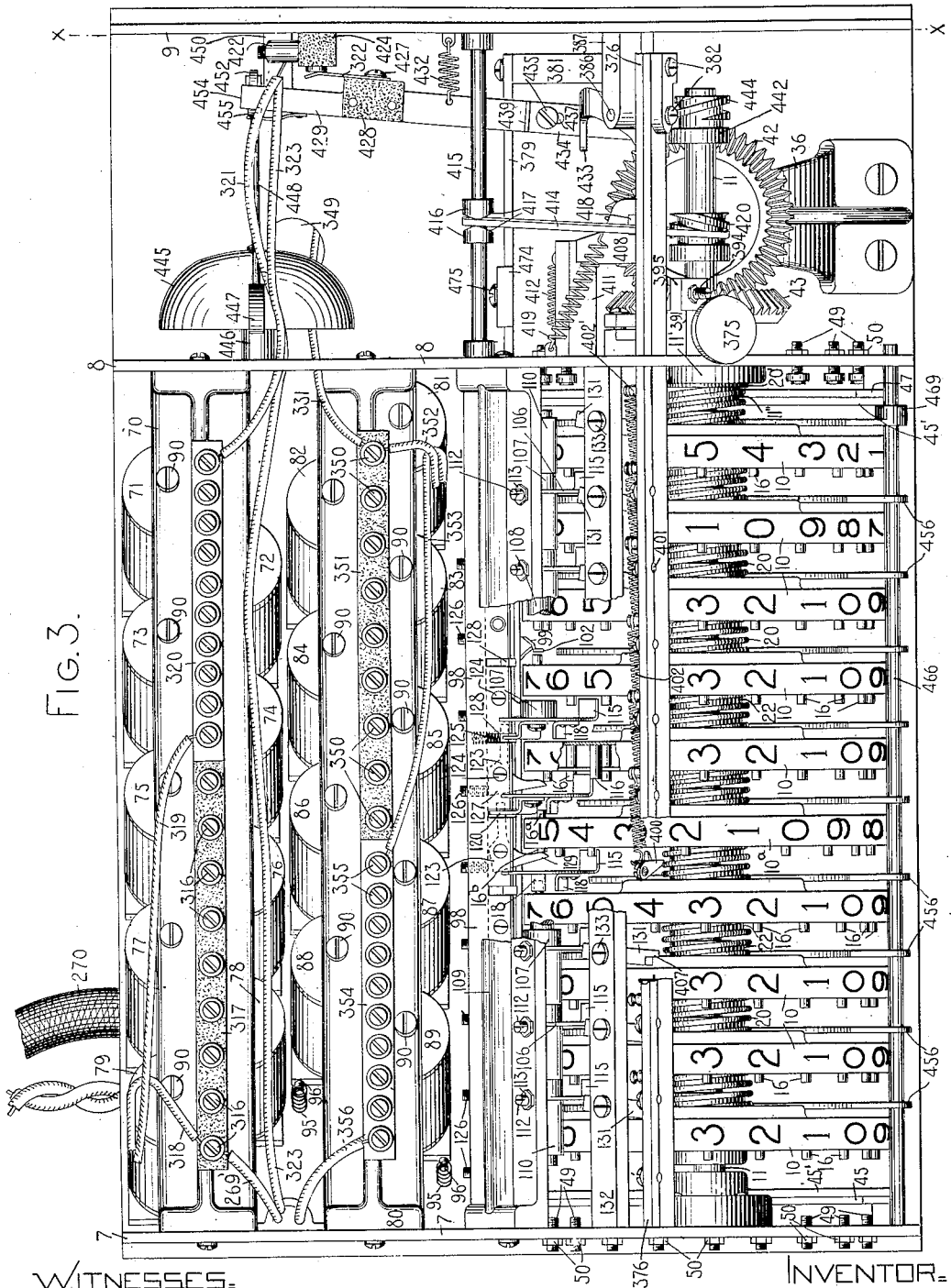
Figure 4:
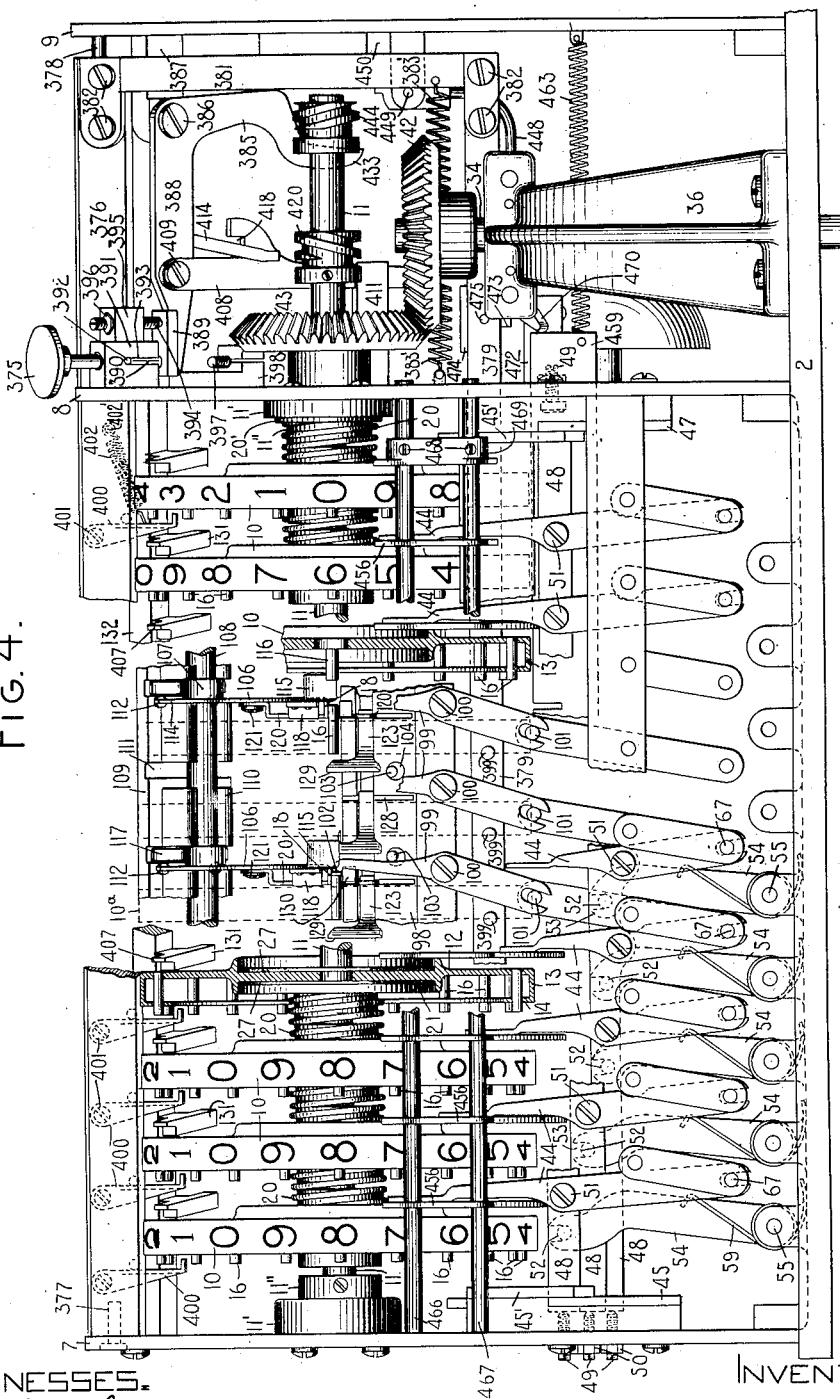
Figure 5:
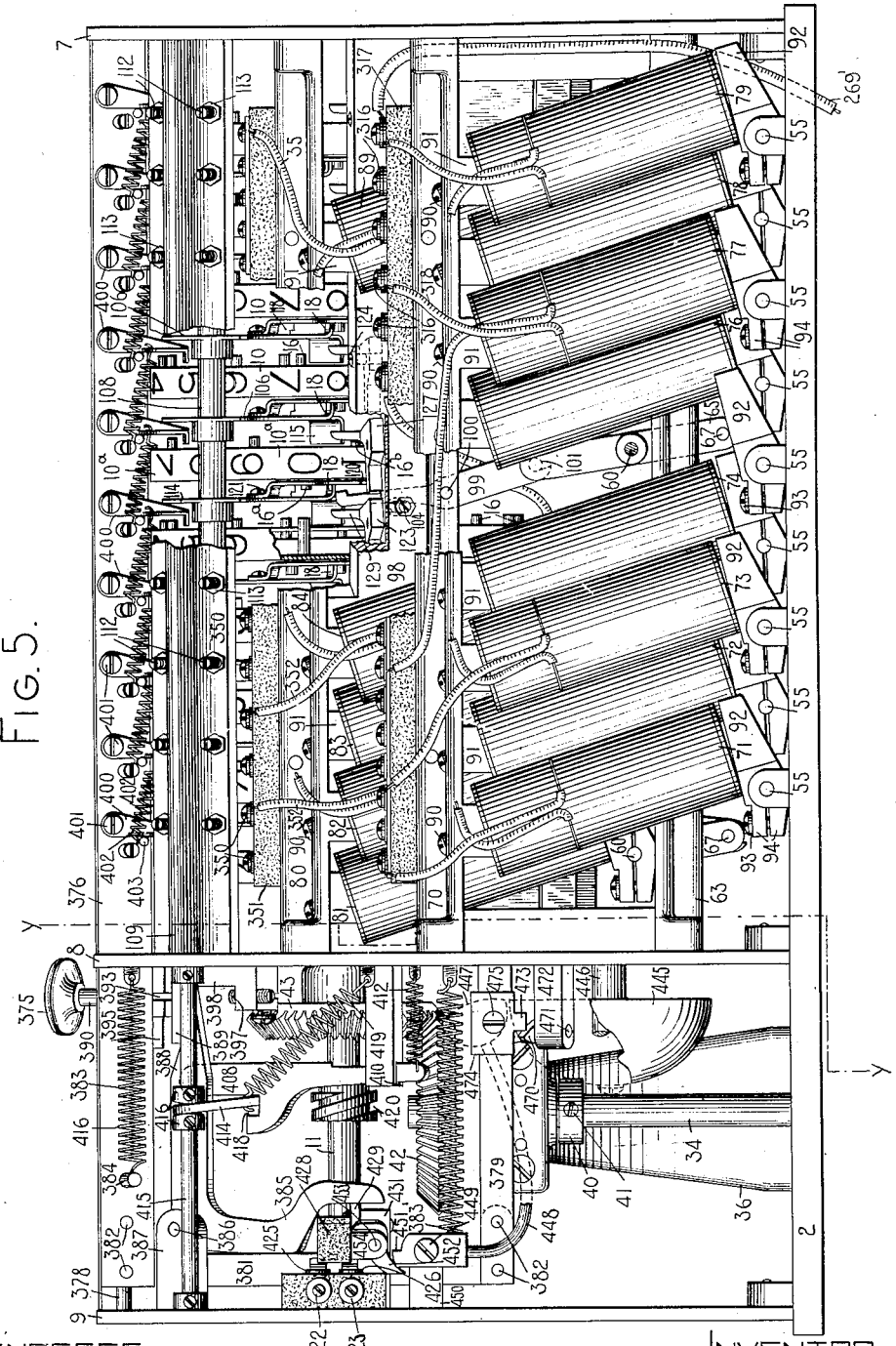
Figure 6:
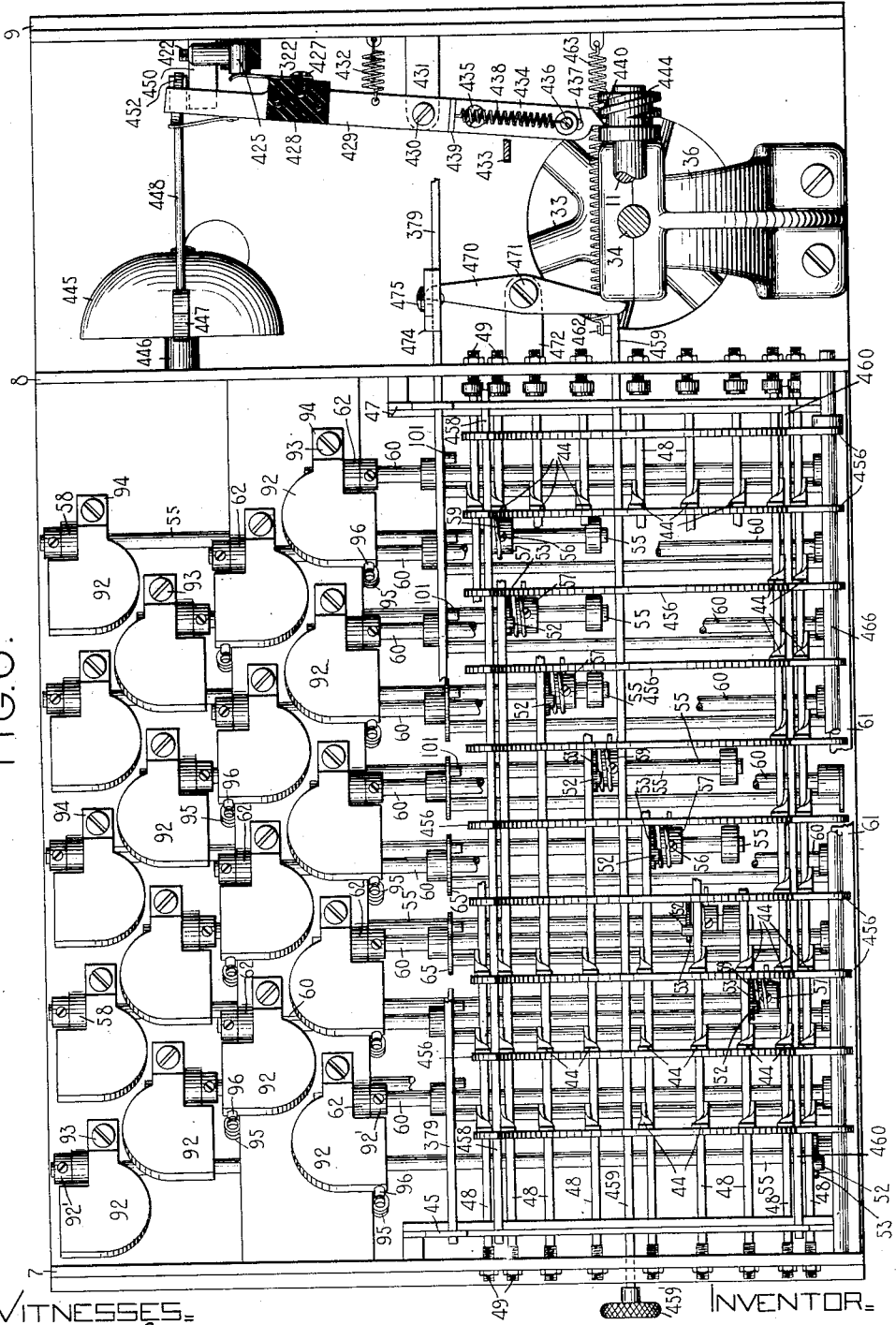
Figure 53:
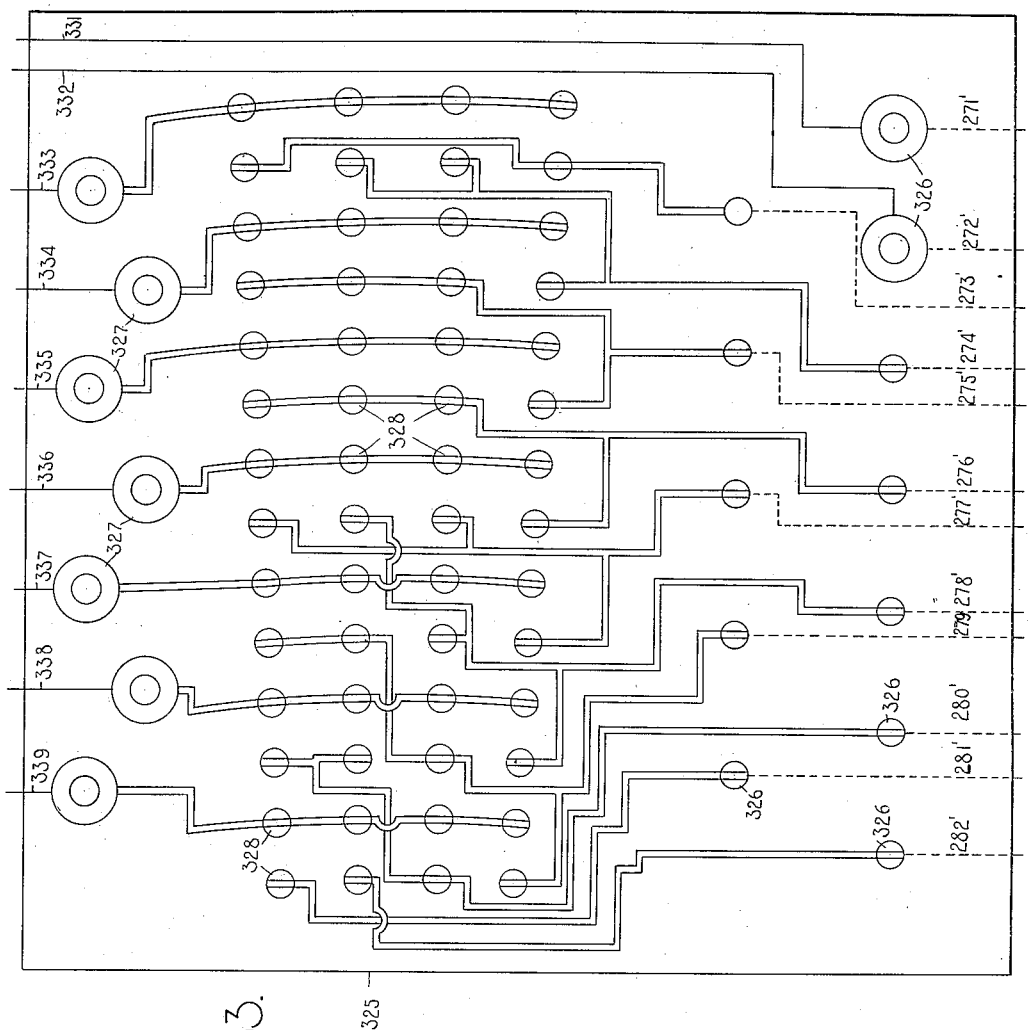

In the accompanying drawings, Figures 1 and 2 are a front and a right-hand end elevation respectively, of my adding machine with the casing in position. In all of the other views the casing is not shown. Fig. 3 is a plan view of my adding machine. Fig. 4 is a front elevation of the upper part of the same. Fig. 5 is a rear elevation of the upper part of my adding machine. Fig. 6 is a plan view of the same with the adding wheels, the magnets and other parts removed. Fig. 7 is a vertical section on the line $x$—$x$ of Fig. 3. Fig. 8 is an irregular vertical section through the adding machine. Fig. 9 illustrates a detail. Fig. 10 is a plan view of the lower part of my adding machine, parts being shown in section on the line $z$—$z$ of Fig. 7. Fig. 11 is an isometric view illustrating the setting mechanism. Fig. 12 is a fragmentary front elevation of the same. Fig. 13 is a side view of one of the register wheels of higher denomination than the lowest. Fig. 14 is a similar view of the register wheel of lowest denomination. Fig. 15 is a fragmentary sectional view through the center of the main shaft, and looking toward the front of the machine. Figs. 16 and 17 illustrate details. Fig. 18 is a front elevation of the lower part of the adding machine. Fig. 19 is a back elevation of the same. Figs. 20, 21, 22, 23 and 24 are detail views of the transfer mechanism. In Fig. 22 a wheel of lower denomination is shown in the act of passing from its "9" to its zero position, and in Fig. 23, the wheel of lower denomination is shown as having reached its zero position and the wheel of higher denomination is shown in the act of turning through one numeral space to register the unit transferred. Figs. 25, 26, 27 and 28 are detail views of the zero setting mechanism. Fig. 29 is a front elevation showing the zero setting mechanism. Figs. 30 and 31 are an isometric view and a plan view respectively, illustrating a circuit controller and alarm mechanism used in connection with the zero setting mechanism. Fig. 32 is a detail illustrating the alarm device connected to the zero setting mechanism. Figs. 33 and 34 are conventional views of a register wheel and are intended to illustrate the principle of the adding machine. Fig. 35 is a view, partly in side elevation and partly in vertical section, of a Remington No. 6 typewriting machine with the devices by which the adding machine is controlled. Figs. 36 and 37 are detail views illustrating circuit controllers mounted on the typewriting machine. Fig. 38 is a plan view of the typewriter key levers and the electric controlling devices controlled thereby. Fig. 39 is a view, partly in elevation and partly in section, illustrating the controlling devices attached to the typewriting machine. Figs. 40 and 41 are a bottom view and a side view respectively of a terminal plug. Fig. 42 is a plan view of a portion of the typewriter with the adding machine controllers connected thereto. Fig. 43 is a vertical section substantially on the line a—a of Fig. 38. Figs. 44 to 52 inclusive are detail views of the circuit controllers governed by the carriage of the typewriting machine. Fig. 53 is a diagrammatic view of the switchboard of the adding machine. Fig. 54 is a diagrammatic view showing the electric circuits by which the adding machine is controlled and operated. Fig. 55 is a conventional view of the tabulator keys and an indicator co-operating therewith.

In most of the figures of the drawings, parts have been shown in section and parts have been removed or broken away for the sake of clearness of illustration.

My adding machine consists of a series of power driven registering elements and means whereby said registering elements are controlled by the keys and carriage of a typewriting machine. In the present instance the registering elements are in the form of wheels having two sets of numerals from 0-9 on their peripheries and connected to a power shaft by frictional contact. The turning of the wheels under the impulse of the power shaft, is controlled by electrical devices which in turn are controlled by the keys and carriage of the typewriting machine. In this instance, as best shown in Figs. 7 and 8, I have found it convenient to divide the adding machine into an upper and a lower part, most of the adding mechanism being in the upper part of the machine, the lower part serving to accommodate the motor and various electrical connections and circuit controllers, as will more fully appear hereinafter.

The framework of the machine comprises a base plate 1 and a middle plate 2 which separates the upper and lower parts of the machine and is supported by the base plate 1 by means of posts 3, 4, 5 and 6. Three vertical plates 7, 8 and 9, supported by the middle plate 2, divide the upper part of the machine into two portions and support most of the adding mechanism. The register wheels 10 are mounted upon a shaft 11, and as shown in Fig. 15, each register wheel comprises a web portion 12, a cylindrical peripheral rim 13, and an annular flange 14, extending inward from the rim and parallel to the web portion 12. In the present instance, the rim 13 has imprinted thereon twenty numerals, or two series of the digits 0, 1, 2, 3, 4, 5, 6, 7, 8, 9. Twenty holes 15 extend through the web 12 and the flange 14, and each hole has loosely mounted therein a stop pin 16, of a length a little greater than the width of the wheel. The pins 16 are held against accidental displacement by flat friction springs 17, bent as shown, and engaging the inside of the rim of the wheel and pressing against the pins. The springs 17 are light and place the pins under only enough frictional restraint to prevent them from being jarred out of place, but not enough to prevent the pins from being moved if any force is applied to them. In their inoperative position the pins 16 have their right-hand ends flush with the web of the wheel and their left-hand ends projecting beyond the flange 14; but any pin may be pushed longitudinally until its right-hand end projects from the web into the path of a stop 18. In Fig. 3, most of the pins are shown in inoperative position, but one pin in the fourth register wheel is shown in operative position, and in the seventh wheel one pin is also shown in such position and in engagement with a stop 18. The pins are omitted in Fig. 15. When any pin is in engagement with the stop 18, the corresponding digit is visible through a slight opening 19, (Figs. 1, 33 and 34). When the parts are in their initial positions, shown conventionally in Fig. 33, the pin corresponding to "0" is in engagement with the stop 18, and the "0" is displayed through the sight opening. If it is desired to add "4", the operative pin is pushed to inoperative position and the fourth pin back of it is pushed to operative position. If power be applied to turn the wheel in the direction of the arrow, Figs. 33 and 34, said wheel will turn until the operated pin engages the stop 18, when the digit 4 will be displayed at the sight opening. Any other digit may then be added in the same way. The stop pins 16 I call digit determining members. It will of course be understood that these digit determining members need not necessarily have the form here shown. For example, they might be mounted to slide radially of the wheel as indicated in the conventional views, Figs. 33 and 34. They need not necessarily be pins at all. Any members mounted in the wheel and settable into and out of position to engage a stop would answer the purpose. I prefer, however, to use pins arranged as shown.

For some of the purposes of my invention, power to turn the register wheels may be applied in any suitable manner; but I prefer that each of the register wheels shall be independently power impelled. The particular means shown in the present case for accomplishing this result, has important advantages. As best shown in Figs. 13 to 17 inclusive, the web 12 of each register wheel is pressed by a coiled spring 20 between two friction disks which are so mounted on the shaft 11 as to be constrained to turn therewith. The friction disk 21 has a hub 22 in which is threaded a set screw 23, the reduced end of which tightly engages the bottom of a longitudinal slot 24 in the shaft 11, thus rigidly securing the disk to the shaft. The other friction disk 25 is free to slide on the shaft 11 but is prevented from rotation relatively to said shaft by a pin 26 inserted in the hub of said disk and engaging loosely in the slot 24. Pads 27 separate the web 12 from each of the friction disks. The spring 20 is compressed between the loose disk 25 of one wheel and the fixed disk 21 of the next adjoining wheel.

The shaft 11 is journaled in bearings 11' secured as by screws to the frame plates 7 and 8. Said shaft is held against endwise motion by collars 11" surrounding said shaft and secured thereto as by set screws (Fig. 4). The right-hand collar 11" has a flange 20' against which the last spring 20 bears.

In some instances contemplated in the present invention, the shaft 11 may be rotated by a crank or other hand operated means, or in any suitable manner; but in the present instance said shaft is rotated by an electric motor 28 in the lower part of the adding machine. Said motor is fastened to the plate 2 by screws 29 (Figs. 10 and 19) passing through ears 30 and threaded into said plate 2. This motor may be of any suitable construction, but it has a shaft 31 on which is fixed a worm 32 engaging a worm wheel 33 fixed to a vertical shaft 34 journaled in a bracket 35 depending from the plate 2 and in a second bracket 36 rising from said plate 2. In order to take up the end thrust of the shaft 31 caused by the engagement of the worm and gear, a steel ball 37 may be mounted to engage the end of the shaft 31 and be held in position by a block 38 engaged by an adjusting set screw 39. The shaft 34 passes loosely through an opening provided for the purpose in the plate 2 and is held against endwise motion by collars 40 fixed to said shaft by set screws 41 threaded into said collars and engaging said shaft. At its upper end the shaft 34 has fixed thereto a bevel gear 42 engaging a bevel gear 43 keyed or otherwise fixed to the shaft 11.

The means for setting the pins 16, corresponding to the several digits to be added, consists of a series of levers 44 and certain devices for actuating the same. Nine levers 44 are provided for each of the wheels on which numbers are to be added, one lever being in position to engage each of the nine pins preceding the one which is in operative position and in engagement with the stop 18. The operation of these levers and the manner in which they are mounted may be most readily understood by reference to Figs. 11 and 12 and also Figs. 4, 6 and 8 of the drawings. A plate 45 is supported adjacent the vertical plate 7 and has in its upper edge nine slots 46. A similar plate 47 is similarly supported on the partition 8 and is formed with a similar series of slots. Nine bars 48 are mounted in the slots 46 and are free to reciprocate longitudinally therein for a limited distance. The reciprocatory movement of said bars 48 is limited in either direction by set screws 49 in the vertical plates 7 and 8. Said set screws are provided with lock nuts 50. Plates 45', secured to frame plates 7 and 8 respectively, are arranged above the bars 48. The bars 48 may be referred to as digit selecting bars as there is one such bar for each of the nine digits. The bar 48 farthest toward the back of the machine corresponds to the digit "1" and each of the levers 44, which are in position to engage the first pins of the several wheels, is supported on this bar by means of a shouldered screw 51 threaded into said bar 48 and serving as a pivot for the lever 44. Similarly all of the levers 44 which are in position to engage the second pins 16 of the several wheels, are pivotally mounted on the second of the bars 48, and so on across the machine. Each of the bars 48 is provided with a pin 52 which is engaged by the crotched end 53 of an arm 54 fixed to a rock shaft 55 by means of a set screw 56 threaded into the hub 57 of said arm and engaging said rock shaft 55. The rock shafts 55 are journaled in lugs 58 rising from the horizontal frame plate 2. A spring 59, coiled about each of the hubs 57, has one of its ends engaging the arm 54 and the other engaging the plate 2. These springs press the bars 48 toward the left-hand end of the machine. Below each register wheel is a rock shaft 60 journaled at one end in a frame bar 61 supported at its ends by the plates 7 and 8. At its other end each shaft 60 is journaled in a lug 62 rising from a frame bar 63 also fixed at its ends to the plates 7 and 8. Each shaft 60 has fixed thereto a yoke-frame comprising arms 64 and 65 fixed to said shaft by set screws 66 threaded in the hubs of said arms and engaging said shaft. The arms 64 and 65 are joined below the shafts 60 by a yoke bar 67 rigidly connected to said arms by set screws 68 threaded into hubs 69 and engaging said bar 67. Each of the levers 44 is forked at its lower end and said fork straddles a yoke bar 67. As there is a yoke frame 67 for each register wheel, I call these yoke frames and their connections denomination selectors. It will be observed that each lever 44 is connected to one denomination selector and to one digit selector.

For some of the purposes of my invention, the rock shafts 55 and 60 may be oscillated by any one of a variety of means, but in the present instance they are actuated by electro-magnets, the electric circuits of which are controlled by the keys and carriage of the typewriting machine. A frame bar 70, preferably of non-magnetic material, is supported at its ends by the plates 7 and 8, and supports a series of electro-magnets 71 to 79 inclusive in position to operate the several rock shafts 55; and a frame bar 80 of similar material is similarly supported by the plates 7 and 8, and supports another series of electro magnets 81 to 89 inclusive in position to operate the shafts 60. For the sake of compactness the electro magnets of each group are arranged in the staggered fashion shown and are supported obliquely by means of screws 90 passing through lugs 91 of said frame bars 70 and 80 and threaded into the cores of the magnets. Armatures 92 are mounted on the shafts 55 and 60, to which they are tightly clamped by screws 93 passing through the upper halves and threaded into the lower halves of split ears 94. It will be perceived that in assembling the machine the several rock shafts and their armatures may be adjusted in proper relation and may be secured in their adjusted positions by tightening the screws 93. As the shafts 60 are higher than the shafts 55, they are made shorter and the shafts 55 are extended under and beyond the frame bar 63, as best shown in Fig. 8. The armatures of the denomination selecting magnets 81 to 89 inclusive are drawn downward away from said electro magnets by means of springs 95 connected at one end to pins 96 projecting from the said armatures, and at the other end to hooks 97 depending from the frame bar 63. In order to prevent endwise motion of the shafts 55 and 60, the lugs 58 and 62 are arranged between the armatures 92 and collars 92', secured to said shafts 55 and 60 by set screws threaded into said collars and engaging said shafts.

As best shown in Figs. 4, 8 and 11 a frame bar 98, supported at its ends by the plates 7 and 8, has a series of releasing levers 99 pivoted thereto by means of shouldered screws 100 passing loosely through said levers and threaded into said frame bar 98. The lower end of each of the levers 99 is forked to engage a pin 101 projecting from an upward extension of the arm 65 of the corresponding denomination selecting yoke frame. There is one lever 99 for each register wheel and each of said levers has its upper end bent, as shown at 102. The bent end 102 of the lever 99 is adapted, when said lever is oscillated, to engage that pin 16 which is in operative position and in engagement with the stop 18 and to reset said pin to inoperative position. The oscillation of the levers 99 on their pivots is adjustably limited in one direction by stops 103 projecting eccentrically from the ends of screws 104 extending through the frame bar 98. Each screw 104 is turned until the lever 99 is properly adjusted and is then secured in adjusted position by tightening a lock nut 105 on the said screw. The means just described limits the oscillation of the rock shafts 60 under the impulse of their spring 95.

The operation of this portion of the mechanism may now be understood. The electrical connections of the digit selecting magnets 71 to 79 and of the denomination selecting magnets 81 to 89 are such that when it is desired to add any given digit on any given register wheel, the denomination selecting magnet corresponding to the selected register wheel and the digit selecting magnet corresponding to the digit to be added, are energized at the same instant with the result that one of the shafts 60 and one of the shafts 55 are simultaneously rocked. The rocking of the shaft 60 results in moving the lower ends of all the levers 44 of the selected denomination a limited distance to the left, and the oscillation of the shaft 55 results in one of the bars 48 being moved slightly to the right and moving with it all of the levers 44 supported thereby. Each of the levers 44 of the selected denomination will be oscillated on its screw 51 as a pivot by the yoke bar 67;

and each of the levers 44, supported by the operated digit selecting bar 48, will be oscillated by said bar 48 about its bar 67 as a pivot, thus moving the upper ends of said levers 44 toward their respective pins 16. Neither the bar 48 nor the yoke bar 67, acting alone, moves any lever 44 far enough to cause it to engage a pin 16. One of the levers 44, however, will obviously have its lower end moved to the left by its yoke bar 67 and its pivot screw 51 moved to the right with its bar 48. This will result in the operative end of said lever moving through a greater distance than it would be moved by either the bar 48 or the yoke bar 67, acting alone; and this lever will press its pin 16 to operative position. This is best understood by reference to Fig. 12, which shows two levers 44 pivoted to the bar 48 corresponding to the digit 9. This figure illustrates the operation of setting the pins to add "9" on the left-hand one of the two register wheels shown. The right-hand lever 44 is shown slightly displaced by the movement of the bar 48 and the left-hand lever 44 is shown fully operated by the combined action of the bar 48 and the yoke frame corresponding to that denomination. It will thus be seen that when one denomination selecting magnet and one digit selecting magnet are energized simultaneously, all of the setting levers corresponding to the selected denomination, and all of the setting levers corresponding to the selected digit, are partially operated and that that setting lever which is of the selected denomination and which corresponds to the selected digit, is fully operated and pushes its pin 16 to operative position. At the same instant the oscillation of the shaft 60 of the selected denomination rocks the lever 99 and restores to inoperative position that pin 16 which was in engagement with the stop 18 and thus leaves the register wheel free to be turned by the friction devices described with the rotary shaft 11 until it is arrested by the newly set pin 16.

In order to provide for transferring from one wheel to another, the stop 18 of each of the denominations above the lowest is made movable. To this end each of said stops 18 is fixed to or forms part of an arm or lever 106 extending between two adjacent register wheels. The hub 107 of the lever 106 is journaled on a rod 108 rigidly mounted in the framework of the machine. As shown, the rod 108 is supported by a frame bar 109 supported at its ends by the plates 7 and 8. The bar 109 has a flange portion 110 having a longitudinal groove or depression in which the rod 108 is seated, thus providing a very rigid support for said rod. Slots 111 are formed in said flange 110 for the levers 106 and their hubs 107. Motion of the levers 106 lengthwise of the rod 108 is prevented by the engagement of said levers and their hubs with the edges of the slots 110. The oscillation of the levers 106 is adjustably limited in both directions by set screws 112 threaded through the bar 109 and secured by lock nuts 113. The levers 106 are extended, as shown at 114, for the purpose of engaging the ends of the set screws 112. The lever 106 may conveniently be formed of sheet metal, in which case the stop 18 is formed by bending to one side a portion of said lever, as shown. Another portion 115 of each lever 106 is bent as shown to form a cam projecting into the path of a pin 116 fixed to the web of the next wheel of lower denomination. In the present instance, in which each register wheel has two series of digits on its periphery, it is of course necessary that each register wheel should be provided with two pins 116. When any register wheel displays the figure "9" through the sight opening 19, its pin 116 occupies the position shown in Fig. 8 and as the wheel passes from the "9" to the zero position, said pin 116 engages the adjacent cam 115 and thus moves the lever 106 toward the back of the machine, as shown in Fig. 22, thus moving the stop 18 out of the path of the pin 16 which is in operative position. By the time the stop 18 has been moved out of the path of the pin 16, the pin 116 of the wheel of lower denomination has escaped from the cam 115 and when said wheel of lower denomination reaches its zero position, said pin 116 occupies the position shown in Fig. 23. The lever 106 is yieldingly held in either of its positions by a flat friction spring 117 shaped as shown and compressed between the frame bar 109 and the hub 107 of said lever 106. When the pin 16 which is in operative position in the wheel of higher denomination, escapes past the stop 18 which has been thus moved out of its path, it engages a cam portion 118 projecting from the lever 106 and thereby restores said lever to normal position. In the present instance, the cam 118 consists of a piece of sheet metal, bent as shown and riveted to the lever 106. The parts are so proportioned that the operative pin 16 engages the cam 118 and escapes past the same within the limits of a single feed unit of the register wheel. Within the same space said pin 16 engages and operates another cam 119 for the purpose of setting the next succeeding pin 16 to operative position. The cam 119 is part of a lever or arm 120 pivoted to the arm 106 at 121. As shown in Fig. 8, the frame bar 98 has a longitudinal slot 122 in the face thereof next to the register wheels. As shown, for example in Figs. 3 and 5, a series of bell crank levers 123 are pivoted in said slot 122 on screws 124 threaded into the bar 98. There is one of these levers for each of the register wheels except that of lowest denomination, and each lever is pressed by a coiled spring 125 seated in a base in the bar 98. Motion of the lever 123 under the impulse of said spring 125, is adjustably limited by a set screw 126 threaded into the frame bar 98 and having its end in engagement with a heel 127 of said bell crank lever.

The arm 120 plays in a slot 128 in the frame bar 98 and engages one of the arms of the bell crank 123. The other arm of said bell crank extends inward along the left-hand face of the register wheel and is formed with a cross portion 129, one face of which is adapted to engage the pins 16. As best shown in Figs. 8 and 22, said cross portion 129 is of such length that when the register wheel is at rest with one of the pins 16 in engagement with the stop 18, the upper part of said cross portion stands opposite said operative pin 16. When the arm 106 is moved by a pin 116 out of the path of the pin 16 which is in operative position, said operative pin 16 engages the cam 119 and presses the lever 120 against the bell crank 123 and oscillates said bell crank on its pivot, with the result that the cross portion 129 engages the next succeeding pin 16 and presses the same into operative position. In the same movement the first operative pin 16 engaging the cam 118, moves the stop 18 into position to arrest the newly set pin 16. The lever 120 has a lug 130 projecting from one side thereof and adapted, when the parts are in normal position, to engage the restoring lever 99 to limit the motion of the lever 120. If, at the time the wheel of lower denomination passes from its "9" to its zero position, the wheel of higher denomination is at rest, the said wheel of higher denomination will immediately be released and will immediately turn through the space of one feed unit and be arrested by the next succeeding pin 16 in the manner described. But if on the other hand, the wheel of higher denomination be itself in motion at the time, then the pin 116 of the wheel of lower denomination will press the lever 106 aside as before and the said lever will be held in this position by the frictional contact of the spring 117 until the erative pin 16 of the wheel of higher denomination encounters the cams 119 and 118, when said operative pin will restore the lever 106 and set the next succeeding pin as before. It will thus be seen that the operation of transferring takes place correctly whether the wheel of higher denomination be in motion at the time the stop 18 is displaced or not. As has been remarked above, when the parts are in their normal positions, the upper part of the cross portion 129 of the bell crank 123 stands opposite that pin 16 which is in engagement with the stop 18. If a number is to be added on this wheel, the releasing lever 99 engages said pin 16 and pushes it to inoperative position. In this operation said upper part of said cross portion 129 serves to prevent said pin 16 from being driven too far and thus being displaced from the wheel.

It will be noted that when the transfer takes place, one of the pins 16 is allowed to pass the stop 18 without being restored to inoperative position. In order to restore such pins to inoperative position, I provide a series of wipers 131, Figs. 3, 4 and 8. Said wipers consist of elongated lugs supported adjacent the right-hand sides of the several register wheels by a frame bar 132 supported at its ends by the plates 7 and 8. The wipers 131 are shown as blocks fastened to said bar 132 by screws 133 and set at an angle so as to wipe or cam to inoperative position any pin 16 which passes the same and which may have been left in its operative position.

As the wheel of lowest denomination never receives motion by transfer from another wheel, it is unnecessary that the stop 18 for said wheel be movable. Such stop may therefore be formed in some other way; for example, as shown in Fig. 9. The stop in this case consists of a fixed arm 18$^a$, which as here shown is integral with a block 134 secured rigidly to the frame bar 98 by means of a screw 135. As shown, another integral arm 136 projects from said block 134 parallel with the left-hand face of the wheel of lowest denomination and in position to prevent overthrow of the pin 16 when said pin is reset by the lever 99.

The adding mechanism above described is capable of operation in either of two ways. According to one mode of operation, the number to be added may be set up, each digit on its appropriate register wheel, by setting in each wheel the appropriate digit determining pin to operative position and resetting that digit determining pin which was formerly in engagement with the stop 18, in the manner which has been described. The several wheels may thus be set up one at a time and the shaft 11 may then be rotated to a suitable extent by whatever means has been provided for the purpose—in this case, by the motor 28—and the shaft 11 may then be stopped. If any wheel had its pins set as described, said wheel would turn with said shaft 11 until the newly set pin engaged the stop 18, or in case of transfer, until said pin had operated the levers 120 and 106 by engagement with the cams 119 and 118, as has been described. Another number could then be set up on the wheels and the shaft again be set in operation, and so on. According to the second mode of operation, the motor may be set in motion once for all and be kept in motion continuously while the machine is in use. Each of the wheels would be held against rotation by a pin 16 engaging its stop 18, but each wheel, independently of the other wheels, would have a tendency to turn due to the frictional contact devices which have been described. If, then, it be desired to add any digit in any denomination, the electric circuit would be closed simultaneously through the appropriate digit selecting magnet and the appropriate denomination selecting magnet, with the result that the operative pin 16 in the wheel of the selected denomination would be reset and another pin, appropriate to the digit to be added, would be set to operative position and the wheel would immediately begin to turn with the shaft. Another wheel might then be set up in the same way to add any digit in another denomination. It will be apparent from the description of the mechanism above given that it will be unnecessary in this mode of operation to wait for one wheel to come to rest before another is released, as the mechanism is so designed that it operates equally well whether the several wheels are in motion one at a time or whether two or more of them are in motion at the same time.

In Figs. 1 and 4, the register wheels are shown as indicating a total of 9,000.82. In Figs. 3 and 5 all of the register wheels are shown in the same positions as in Figs. 1 and 4, except the sixth wheel which is shown as in the act of moving from its "8" to its "9" position by transfer from the preceding wheel. In said figures I have designated said sixth wheel by the reference character $10^a$. It will be observed that one of the digit determining pins, which I have here designated as $16^a$, is passing the cams 119 and 118 and that in consequence the lever 120 is pressed toward the back of the machine and the lever 123 is in its operative position and is pressing the pin $16^b$ into operative position ready to be engaged by the stop 18 and to thereby arrest the wheel $10^a$ in its "9" position.

It will be observed that in transferring, the wheel of lower denomination merely displaces the lever 106 and the stop 18. The remainder of the operation is performed by power transmitted through the wheel of higher denomination.

In Fig. 3 the lever 120, co-operating with the seventh register wheel, is omitted so as to show the stop 18 in operative position and engaged by a pin 16. In the same figure it will be observed that the fifth register wheel is partly broken away, showing the pin 116 which has just escaped from the cam 115 and the transfer lever 106 which co-operates with the 6th wheel $10^a$. In the same figure the transfer lever between the third and fourth wheels has been omitted altogether in order to show the resetting lever 99 in position to engage the operative pin 16 of the fourth wheel.

As has been said above, my invention has for one of its principal objects the provision of means for automatically adding columns of figures written on an ordinary typewriting machine. To this end the electric circuits of the digit selecting and denomination selecting electro-magnets are controlled by the keys and carriage of the typewriting machine. Said electric circuits may be controlled by the mechanism of any typewriting machine which has a set of keys including numeral keys and which has some part movable step-by-step for letter spacing. Most of the typewriting machines in use have a series of keys connected by some means to a corresponding series of types in such a manner that a depression of any key causes the corresponding type to print upon the paper. In some machines, as for example, in most of the so-called book typewriting machines, the printing mechanism is moved step-by-step over the paper. In others, the paper is supported on the paper carriage, to which a step-by-step motion is imparted. The means which I have devised for connecting the typewriting machine and the adding machine may be readily adapted to either of these sorts of typewriting machines or to any other mechanism in which the depression of numeral keys results in step-by-step motion being imparted to some part of the mechanism. In the present instance, I have illustrated the circuit controlling means attached to a No. 6 Remington typewriting machine. As this machine is well known to those familiar with the art, it will be described only in the most general way. The machine is shown in Figs. 35—42 and as best shown in Fig. 35, it comprises a frame in which are pivoted a series of character keys 137 connected by links 138 to type bars 139, each of which carries at its free end two types 140. The platen 141 is carried by a shaft 142 journaled in a frame 143 connected to a carriage truck 144 by a pivoted frame 145 and supported at its front side by a roller or rollers 146, the grooved periphery of which rests on a rail 147 supported by arms 148 pivoted to the framework at 149, the construction being such that the arms 148 may be rocked on their pivots and the platen frame be thus moved, rocking the frame 145, so that the platen 141 may be struck by either one or the other of the types 140, as may be desired. This is the well known case shift mechanism of this type of machines. The arms 148 are connected to an arm 150 which in turn is connected by a link 151 to a case shift key lever 152 pivoted to the framework at 153. The carriage is drawn across the machine by a spring coiled within a drum 154 and having wound about its periphery a band 155 fastened at one end to said drum and at the other end connected to said carriage. The step-by-step feed of the carriage is controlled by dogs 156 on the end of an arm 157 forming part of a rock frame which is moved in one direction by a universal bar 158 extending under all of the key levers and connected to said rock frame by a link 159; and said frame is moved in the opposite direction by the usual spring 160. The dogs 156 co-operate with an escapement wheel 161 which controls a shaft, on the other end of which is fixed a pinion 162 engaged by a rack 163 pivotally connected to the carriage truck at 164. The carriage truck has a rearwardly extending guide arm 165 connected to which is a sleeve 166 which slides freely on a stationary rod 167. My adding attachment is advantageously used in connection with a denominational tabulator and such a device is shown in the drawings. A squared bar 168 is supported on the carriage by means of a frame 169, arms 170 of which extend from the carriage upward and toward the back of the machine. The bar 168 has in two of its sides grooves 171 a letter space distance apart and these grooves are adapted to retain in place one or more tappets 172 in a manner well known in the art. A stationary frame piece 173 is fastened to the back shelf of the typewriter frame and is braced near its upper end by a yoke-shaped piece 174 connected to the rod 166 in the usual manner. A series of levers 175 are pivoted in the frame 173 at 176 and have their upper ends so formed and so positioned that when any of said levers is rocked forward, said upper end is moved into the path of said tappet 172. The levers 175 are adapted to be oscillated in the manner indicated by means of push rods 177 extending toward the front of the machine beneath the key levers and terminating in finger buttons 178. Springs 179 normally hold the rods 177 in their forward positions. The levers 175, near their upper ends, engage a yoke frame 180 pivoted at 181 and having a forwardly extending arm 182 and a set screw 183, which engages the back end of a lever 184 pivoted to the framework at 185 and extending at its forward end beneath the rack bar 163. The construction is such that whenever any lever 175 is oscillated, the frame 180 will be rocked and the rack bar 163 will be lifted out of engagement with the pinion 162 by the lever 184, thus releasing the carriage and permitting it to move under the impulse of a spring drum 154 until the tappet 172 engages the operated denomination stop 175 and the carriage is thereby arrested. The principal use of the tabulator mechanism described is in writing figures in columns. There is a denomination stop for each denominational position in the column of figures and the tabulator mechanism forms a convenient means for quickly bringing the carriage to any desired denominational position. The mechanism thus far described is old and well known.

The circuit controllers which are connected directly to the keys, are contained within a box 186 preferably made of insulating material and supported on the back shelf 187 of the typewriting machine. In the present instance, in which the parts are adapted for attachment to a Remington No. 6 typewriting machine, the said box 186 has the general form best shown in Figs. 38 and 39, and comprises a base and sides and a removable lid 188. A fixed rod 189 is supported at its ends by posts 190 rising from the base of the box 186. Said rod passes through said posts and is held fixedly by screws 191 threaded into said posts and engaging said rod. Pivoted to said rod 189 are a series of nine arms 192, one of said arms being substantially above each of the numeral key levers "2," "3," "4," "5," "6," "7," "8," and "9" and the "L" lever, which is used for printing the numeral "1." The arms 192 are held against motion longitudinally of the rod 189 by collars 193 on said rod, which collars are held in place by set screws. Each of the arms 192 is pressed upwardly by a spring 194, compressed between said arm and the base of the box 186. The upward motion of said arms is adjustably limited by a series of set screws 195 threaded through a bar 196 supported at its ends by posts 197 fixed to the base of the box 186. Each of the screws 195 is provided with a lock nut 198. Each of the arms 192 has near i s free end a contact piece 199 adapted, when the arm is depressed, to engage a contact piece 200. Said contact pieces 200 are fixed to the ends of plate springs 201 to 209 inclusive. The plate spring 201 co-operates with that arm 192 which is above the "L" key; the plate spring 202 co-operates with the "2" key, and so on. The arms 192 are adapted to be depressed by hook-arms 210 pivoted to the numeral key levers 137 at 211. The hook arms 210 extend upward from the key levers through openings provided for the purpose in the base of the box 186 and rest in notches 212 in the arms 192. The hook arms 210 are each formed with a hooked or shouldered portion 213 and a vertical straight face 214, as shown. Said hook arms are pressed forward into the slots 212 by springs 215 secured to said hook arms and pressing against the tops of the key levers as shown. A rock shaft 216 is pivoted in lugs 217 rising from the base of the box 186 and has fixed thereto arms 218 which are connected by a yoke bar 219, the whole constituting an oscillating yoke frame. The bar 219 extends in front of the straight faces 214 of all of the hook arms 210 so that if said yoke frame be oscillated toward the rear of the machine, the hook arms 210 will be rocked on their pivots 211 against the tension of the springs 215, out of position where the shoulders 213 could engage the arms 192, for a purpose which will appear hereinafter. The yoke frame is oscillated in the manner described by the armature 220 of an electro magnet 221. Said armature is connected to said yoke frame by a link 222 pivoted to the rod 219. The armature 220 is slotted, as shown at 223, and said link 222 is pivoted in said slot as best shown in Fig. 43. In said Fig. 43, the armature is shown in section through said slot 222 and it will be seen from said figure that the armature is pivoted at 224 in lugs 225 rising from the base of the box 186. Motion of the armature 220 away from magnet 221, is adjustably limited by a set screw 220', threaded into a post, rising from the base of the box 186. The contact springs 201 to 209 inclusive are fixed to the base of the box 186 by screws 226 and said contact springs tend to bend upward. The upward motion of said springs is adjustably limited by thumb nuts 227 threaded on screw posts 228 rising from the base of the box 186 and passing through openings 229 in said springs (Fig. 38). It will be observed that if a numeral key lever 137 be depressed, its hook arm 210 will engage its arm 192 and depress the same until the contact 199 engages the contact 200 and that said contact 200 is yieldingly mounted so as not to interfere with the further depression of the key lever. In one corner of the box 186 I secure a series of ten plate springs 230 to the base of said box by screws 231. Nine of these springs are connected to the several contact springs 201 to 209 inclusive by wires 232. The removable lid of the box 186 has a cut-away portion over the corner of the box occupied by said springs 230 and said cut-away portion is filled by a fixed plate of insulating-material 233 supported at its free corner by a post 234 rising from the base of the box 186. Said plate 233 has an opening 235 for the insertion of an insulating plug 236. Said insulating plug has depending therefrom ten contact pieces 237, one adapted to contact with each of the springs 230. The springs are bent in such a form as to be adapted to engage said contact pieces. A pin 238, inserted in the opening 239 in said insulating plug 236 and in similar openings in the plate 233, serves to retain said insulating plug 236 in position. Said insulating plug may be readily removed by withdrawing the pin 238 and lifting the plug out of the opening 235. The contact plugs 237 are separated by strips of insulating material 240. Ten insulated wires 241 are inserted in the insulating plug 236 and are each connected electrically with one of the contact pieces 237. It will be obvious from what has been said that nine of these wires will be electrically connected through the contact pieces 237, springs 230 and wires 232, with the several contact springs 201 to 209 inclusive. The tenth wire 241 is a common conductor, the connections of which will presently be described.

As best shown in Figs. 35, 36 and 37, a piece of insulating material 242 is secured to a portion of the framework 243 of the typewriting machine by means of a clamp 244 having a set screw 245 therein to engage said frame piece. A post 246 of conducting material is secured to the plate 242 and has pivoted thereto an arm 247 controlled by a finger piece 248, by manipulation of which said arm 247 is adapted to be moved into or out of contact with a terminal post 249. A spring conductor 250 is connected to the post 246 and presses upwardly against a terminal 251 secured to the insulating plate 242. A block 252 has a slot 253 therein for the reception of the link 151 which connects the case shift key 152 with the arm 150. The block 252 is rigidly secured to the link 151 by a set screw 254 threaded into said block and engaging said link. Said block 252 has a depending insulating portion 255 adapted, when the case shift key is depressed, to engage the spring 250 and to depress the same out of contact with the terminal 251, as shown in dotted lines in Fig. 37. The terminal 251 is connected to a wire 256 which enters the box 186 and is connected to the tenth spring 230 above described. The post 249 is connected to a wire 257 which also enters the box 186 and is connected to a binding post 258 secured to the base of the box 186. Said binding post 258 is connected by a wire 259 to the electro magnet 221, which in turn is connected by a wire 260 to the stationary rod 189. It will be apparent that if the switches 247 and 250 are both closed, an electric circuit may be made through the tenth wire 241, wire 256, post 251, spring 250, switch 247, post 249, wire 257, binding post 258, wire 259, magnet 221, wire 260, bar 189 and whatever arm 192 may be depressed by its key, through the corresponding one of the contact springs 201 to 209 inclusive and the wire 241 connected thereto. It will also be apparent that no circuit can be completed through this chain of conductors if the switch 247 is open or if the case shift key is in its depressed position. In the diagram of the electric circuits, shown in Fig. 54, I have designated the nine wires 241, which are connected to the contact springs 201 to 209 inclusive by reference numerals 261 to 269 inclusive. In Fig. 39 all ten of these wires are designated by the reference numeral 241. The wires 241 enter a cable 270 which connects the typewriting machine with the adding machine. The wires 261 to 269 inclusive are connected respectively by conductors, which will be more particularly described hereinafter, to the digit determining electro magnets 71 to 79 inclusive. The cable 270 also contains a group of wires which are connected, by means that will be described hereinafter, to the several denomination selecting electro magnets 81 to 89 inclusive. The last mentioned wires terminate in a series of contacts 271 to 282 inclusive, (Fig. 50). Said contacts consist of pins of conducting material inserted in a block 283 of insulating material, removably secured to the bar 174 which serves as a brace for the upper part of the tabulator frame piece. Said block 283 is preferably of the rectangular outline shown in Figs. 48 and 52, with the two lower corners cut away as shown at 284 and 285. A clamp piece 286 is cut away as shown in Fig. 51 to form a slot 287 adapted to fit over the bar 174, to which said clamp piece is secured by a set screw 288 threaded into said clamp piece and engaging said bar. The clamp piece 286 is adapted to fit into the cutaway portion 285, and a pin 289 projecting from the side of said clamp piece is adapted to enter a hole 290 in said insulating block 283. Another clamp piece 291, of a form similar to the clamp piece 289, is secured to said insulating block 283 as by a pin 292, (Fig. 39). A screw 293, preferably provided with a milled head as shown, is threaded into said clamp piece 291 and is adapted to engage the bar 174. The construction is such that the insulating block 283 may be properly adjusted on the bar 174 and clamped into position by tightening the screws 288 and 293. The insulating block 283 may be readily removed from the bar 174 at any time by loosening the thumb screw 293 and then removing the insulating block 283, leaving the clamp piece 286 in position. The insulating block may then be replaced at any time without the necessity for re-adjustment. The wires from the cable 270 are connected to the contact pieces at the back of the insulating block 283 as shown. The contact pieces 271 to 283 inclusive are arranged in the insulating block 283 in two rows and have the staggered arrangement shown in Figs. 48 and 50. Between the two rows of contact pieces there is set into the front face of the insulating block 283 a common contact bar 294, which is held in place by screws 295 and 296, the latter of which is connected to a wire 297 (Fig. 39). Said wire 297 enters the cable 270 back of the insulating block 283 and, emerging from said cable at 241, is connected to the tenth contact piece 237 which is connected by a contact spring 230 to the wire 256, as above described.

A bracket 298 is formed with an opening 299 adapted to receive the bar 168 which is mounted on the paper carriage of the typewriting machine as has been described. The bracket 298 is secured to said bar 168 by a thumb screw 300 threaded through a portion of said bracket and engaging said bar. A shoe 301 is secured to the bracket 298 by screws 302 and is insulated from said bracket and screws by washers and sleeves of insulating material 303, as best shown in Fig. 52. Three contact pins 304, 305 and 306 are loosely seated in chambers 307 formed in the head of the shoe 301. The contact pins 304, 305 and 306 each consists of an enlarged head 308 having a tapering point, as shown, and a screw 309 threaded into said head 308. A spring 310, coiled about the shank of the screw 309, presses the contact pin outward. Motion of the contact pin, under the impulse of said spring, is limited by the head of the screw 309 engaging the shoe 301. The contact pins 304 and 306 are adapted, as the carriage is moved across the machine, to engage the upper and lower rows respectively of the contact pieces 271 to 282 inclusive and the pin 305 is adapted to engage the contact bar 294. The tapered ends of the contact pins serve as cams whereby said pins are slightly pushed back into their sockets against the tension of the springs 310 when the contact pins encounter the edge of the insulating block 283. As the pins pass over the face of the block 283, they are pressed by the springs 310 into engagement with the several contact pieces. The contact pieces 271 to 282 inclusive have the staggered arrangement shown, the contact pieces of one row being in a vertical plane intermediate the contact pieces of the other row. The vertical planes of the contact pieces are a distance apart equal to a letter space feed of the typewriting machine so that as the carriage is moved across the machine step-by-step in writing figures in a column, the common contact bar 294 is connected through the contact pins of the insulated shoe 301 to the several contact pieces in succession, beginning with that of highest denomination.

I prefer to use the parts above described as follows:—The tappet 172 of the tabulator is inserted in any one of the slots 171 and the left-hand tabulator key is then operated and the carriage brought to the corresponding position. The bracket 298 is placed on the bar 168 with its end pressed into contact with the tappet 172, as shown in Fig. 42. The insulating block 283, with its clamp pieces 291 and 286, is then placed on the bar 174 and so adjusted along said bar that the contact pin 304 is in engagement with the contact piece 273. The screws 288 and 293 are then tightened. When the parts are used in this way, no further nice adjustment is necessary. If it be desired to write a column of figures in some other position on the paper, the tappet 172 is inserted in some other of the slots 171 and the bracket 298 is slid along the bar 168 until it is again in contact with the tappet 172 as before. As the spacing of the slots 171 is exactly the same as the letter spacing of the machine, the pins 304 and 306 will always be in position to engage the proper contact pieces 271 to 282 inclusive.

The wires which are connected to the contact pieces 271 to 282 inclusive, may each be conveniently designated by the same reference numeral as its contact piece, with an accent added. These wires will accordingly be designated by the reference characters 271' to 282' inclusive.

The cable 270, containing the wires 261 to 269 inclusive and 271' to 282' inclusive, enters the lower part of the adding machine and is held in place by a clamp 311, (Fig. 10). The wires 261 to 269 inclusive terminate in a set of binding screws 312 supported by a plate of insulating material 313 which in turn is supported by brackets 314 depending from the horizontal plate 2 to which they are secured, as for example, by screws. The several binding screws 312 are connected by wires 261' to 269' to binding screws 316 carried by a strip of insulating material 317 secured to the frame bar 70 which supports the digit selecting magnets 71 to 79 inclusive. Each of the binding screws 316 is connected by a wire 318 to one of said digit selecting magnets, all of which are in turn connected by wires 319 to a common conductor 320 carried by the insulating strip 317. One only of each of the wires 318 and 319 is shown in Fig. 3 but the others are connected up in a similar manner to the several binding screws. As the binding screws 316 are used merely as a matter of mechanical convenience, the wires 261' to 269' inclusive are shown in the diagram in Fig. 54 as connected directly to the several magnets 71 to 79. The common conductor 320 is connected by a wire 321 to a switch 322, which in turn is connected by a wire 323 to a terminal 324 supported in the insulating plate 313. The purpose of the switch 322 will be explained hereinafter.

I have provided in the adding machine nine denomination selecting electro magnets and, in the controller attached to the typewriting machine, twelve denomination selecting contact pieces 271—282 inclusive; and I have provided means whereby the electric connections of said magnets with said contacts may be varied in order to vary the spacing of the printing for the purpose of punctuation. It is obvious that in any arrangement there will be three of the contact pieces which are not connected to any electro magnet. If the contact pieces 280, 281 and 282 be disconnected and the remaining contact pieces be connected to the electro magnets in regular succession, then when the carriage is so positioned that the contact pins engage the contact piece 279, the typewriting mechanism will be in position to add whatever number may be written by the keys on the ninth register wheel and the register wheels will be connected to the typewriting machine one after another as the carriage moves along step-by-step. The parts will be connected up in this manner when it is desired to write numbers without any punctuation. If, however, the contact pieces 273, 277 and 281 be disconnected and the remaining contact pieces be connected to the electro magnets in regular succession, then numbers written in the form 4 444 444 44 will be correctly added on the adding machine. If the contact pieces 274, 276 and 282 be disconnected and the remaining contact pieces be connected in regular order to the electro magnets 81 to 89, then numbers written in the form 444 444 444 will be correctly added in the adding machine. If contact pieces 282, 281 and 273 be disconnected, numbers written in the form 4444444 44 will be correctly added on the adding machine. Punctuation marks, such as the decimal point and commas may be written in the spaces left by the disconnected contact pieces, if desired. Obviously, the connections of the contact pieces with the electro magnets might be varied in other ways if desired; but the connections given above are useful, and they are the ones which the present machine is adapted to make. To this end the wires 271'—282', upon emerging from the cable 270, are led to a switch-board 325 where they end in terminals 326 at the lower part of the switch-board. Said switch-board is supported by brackets 325' depending from the horizontal frame plate 2. As the contact pieces 271 and 272 are always connected to the electro magnets 81 and 82, the wires 271' and 272' are merely connected through their terminals 326 to said electro magnets by wires 331 and 332, leaving seven electro magnets, the connections of which are to be varied. In the upper part of the switch-board 325 are arranged seven terminals 327, to which are connected respectively a wire 333 from electro magnet 83; wire 334 from electro magnet 84; wire 335 from magnet 85; wire 336 from electro magnet 86; wire 337 from electro magnet 87; wire 338 from electro magnet 88; and wire 339 from electro magnet 89. The contact pieces 328 are arranged in substantially horizontal and vertical rows, there being fourteen vertical rows and four horizontal rows. All of the contact pieces in each alternate vertical row are connected to one of the terminals 327 and each of the contact pieces in the several remaining vertical rows is connected to one or another of the terminals 326. As best shown in Fig. 19, a lever 340 is pivoted at 341 to a lug projecting from the frame post 4 of the adding machine, and said lever extends along the back side of the adding machine and projecting through a slot 342 in the casing (Fig. 2), is provided with a handle 343. A strip of insulating material 344 is secured to the lever and has fixed thereto seven contact springs 345, as shown in Figs. 10 and 19. Each of these springs is forked and one fork of each spring is adapted to contact with one of the vertical rows of contact pieces 328 which is connected to one of the terminals 327, and the other fork of each spring is adapted to engage the contact pieces of the next adjacent vertical row, which contact pieces are connected to the terminals 326. It will thus be seen that when the lever is in position for the springs 345 to engage one of the horizontal rows of contact pieces, each of said springs serves to connect one of the terminals 326 to one of the terminals 327. The vertical rows of contact pieces 328 are arranged substantially in arcs of circles about the pivot 341 as a center, and the horizontal rows are approximately radii of said arcs. By an inspection of Fig. 53, it will be seen that when the lever 340 is in its highest position in engagement with the first horizontal row of contact pieces, the connections between the wires will be as follows:— 333 to 273'; 334 to 275'; 335 to 276'; 336 to 277'; 337 to 279'; 338 to 280'; 339 to 281'. In this connection, wires 274', 278' and 282' are not connected to any electro magnet. It will be evident, therefore, that when the lever 340 is in this position, the machine is connected up to add numbers of the form 444 444 444.

When the lever 340 is in its second position, the connections are as follows:—333 to 274'; 334 to 275'; 335 to 276'; 336 to 278'; 337 to 279'; 338 to 280'; and 339 to 282'. In this arrangement wires 273', 277' and 281' are not connected with any electro magnet This position of the lever, therefore, corresponds to the form of punctuation 4 444 444 44.

When the lever 340 is in its third position, the connections are as follows:—333 to 274', 334 to 275'; 335 to 276'; 336 to 277'; 337 to 278'; 338 to 279'; and 339 to 280'. The wires 282', 281' and 273' are not connected to any electro magnet. This position of the lever, therefore, corresponds to the form of punctuation 4444444 44.

When the lever 340 is in its fourth or lowest position, the connections are as follows:— 333 to 273'; 334 to 274'; 335 to 275'; 336 to 276'; 337 to 277'; 338 to 278'; and 339 to 279'. The wires 282', 281' and 280' are not connected to any electro magnet. This position of the lever 340, therefore, corresponds to the form of punctuation 444444444.

The lever 340 has on the back side thereof a lug 346 adapted to be pressed into notches 347 in one side of the frame post 5, through the tension of contact springs 345, in order to retain the lever in any one of the four positions to which it may be adjusted. A scale 348 is attached to the end of the machine adjacent the slot 342 to indicate the character of punctuation corresponding to the several positions of the lever.

The wires 331 to 339 inclusive are led upward through an opening 349 in the plate 2 to binding screws 350 supported by a strip of insulating material 351 secured to the frame bar 80. Wires 352 connect the several binding screws 350 to the several denomination selecting electro magnets, which in turn are all connected to a common conductor bar 354 by wires 353 terminating in binding screws 355. Said bar 354 is secured to the insulating strip 351 and is connected by a wire 356 to a terminal 357 in the terminal board 313.

The adding machine is connected to any suitable source of electric power by two wires 358 and 359. The wire 358 is connected directly to the terminal 357 in the insulating plate 313 and the wire 359 is connected to the terminal 324 through a switch 360. Said switch may conveniently be situated as shown, in the base of the adding machine. As shown, a piece of insulating material 361 is secured to the base plate 1 of the adding machine and the switch arm 360 is pivotally connected to a post 362 to which the wire 359 is connected by a binding screw 363. A contact post 364 has a binding screw 365 which retains a wire 366 connected to said terminal 324. The switch 360 projects through a notch 367 in the base of the machine (Fig. 1) and is provided with a finger button 368.

The wires 369 and 370, which conduct the power to the motor 28, are connected to the terminals 357 and 324 respectively. In order to regulate the speed of the motor, a resistance coil 371 may be inserted in the motor circuit as shown. In the present case, the resistance wires are wound about a drum 372 of insulating material, secured to the plate 2 by means of a screw 373. A double binding post 374 may conveniently be placed in the insulating plate 313 in order to connect the resistance coil 371 with the motor wire 370. It has not been thought necessary to show the resistance in the diagram in Fig. 54.

As the different tabulator keys 178 have different denominational values according to the form of punctuation used, I have provided an adjustable indicator to co-operate with said keys and to indicate the denominational value of each key according to the several styles of punctuation. To the frame bar 485 through which the rods 177 slide, I secure lugs or ears 486 in which are pivoted trunnions 487 of a square indicator bar 488, (Fig. 35.) In Fig. 55 I have shown the development of the surface of this bar. Each of the rows of numerals 489 represents one face of the bar on which are imprinted numerals or other characters to indicate the denominational value of each key according to the particular style of punctuation used at the time.

When the lever 340 is in its highest position, the indicator is turned till the surface 489 is visible to the operator. When the lever 340 is in its second position, the surface 490 is used and surfaces 491 and 492 correspond to the third and fourth positions of the lever 340 respectively. The indicator is yieldingly held in either of its positions by a flat spring 493 secured to the bar 485 and pressing against one of the faces of the indicator bar. The use of this adjustable indicator greatly facilitates the use of the tabulator in connection with the adding machine.

The operation of my machine in adding a column of figures may now be understood. The tappet 172 is fixed in that slot 171 of the bar 168 which corresponds to the third letter-space position of the column of figures to be printed and added. This will be the position of the decimal point if the second or third form of punctuation is used, and the position of the hundreds denomination if the first or fourth form of punctuation is used. The bracket 298 is then placed in contact with said tappet and secured in position by tightening the thumb screw 300. The lever 340 is adjusted by reference to the scale 348 to the position corresponding to the style of punctuation which it is desired to use; the scale or indicator 488 is correspondingly adjusted, and the motor is started by closing the switch 360. If the register wheels are not in their zero positions they will be brought to such positions by means which will be hereinafter described. The typewriting machine may be used in the ordinary way for writing words or figures as may be desired in any other part of the line of writing than that in which the column of figures is to be written; and words or figures may be written in such part of the line without affecting the adding mechanism if desired, if the switch 247 be first opened. For the purpose of illustration we will assume that the numbers to be written and added are amounts of money in United States currency, and it is desired to point off the figures with commas and the decimal point. The lever 340 will then be set with the lug 346 engaging the second notch 347 and the springs 345 in engagement with the second horizontal row of contacts 328 and the indicator or scale 488 will be set with its surface 490 toward the operator. We will assume that the first number to be written and added is 3,528.65. The tabulator key 178, corresponding to the thousands denomination as shown by the indicator will be operated, which will result, as has been described above, in releasing the feed rack 163 from the pinion 162 and permitting the carriage to move across the machine until the tappet 172 is arrested by the appropriate denominational stop 175. This will arrest the carriage in that position in which the contact piece 278 is engaged by the contact pin 306. The numeral key 137, which is adapted to print the numeral 3, is then struck in the usual manner, with the result that the figure 3 will be printed in its appropriate denominational position on the paper and the hook-arm 210 will engage and depress the pivoted arm 192 until the contact 199 is brought into engagement with the contact 200 of the conductor spring 203. A complete electric circuit will then be established as follows:— From the source of electric power to wire 358, terminal 357, wire 356, common conductor bar 354, one of the wires 352, electro-magnet 86, wire 336, and its terminal 327 and contact piece 328, spring 345, another contact piece 328 to wire 278', contact piece 278, contact pin 306, shoe 301, contact pin 305, common contact bar 294, wire 296, through the tenth contact piece 237 and its corresponding spring 230 to the wire 256, switch 247, switch 250, wire 257, terminal 258, wire 259, electro-magnet 221, wire 260, universal bar 189, one of the arms 192, conductor spring 203, through that wire 232, spring 230 and contact piece 237 which is connected to the conductor spring 203, wire 263 and its terminal 312, wire 263', digit selecting magnet 73, wire 319, common conductor bar 320, wire 321, switch 322, wire 323, terminal 324, wire 366, switch 360 and back to the source of electric power by the wire 359. It will be seen that a depression of the key thus completes an electric circuit in which the electro magnets 221, 73 and 86 are connected in series, so that all three of these magnets are simultaneously energized. The armatures of the electro magnets 73 and 86 will be simultaneously moved, with the result that the third shaft 55 and the sixth shaft 60 will be simultaneously rocked, thus reciprocating the third bar 48 and oscillating the sixth denomination selecting yoke frame. All of the levers 44 which co-operate with the sixth register wheel, will be partially operated by the oscillation of the yoke frame, and all of the levers 44 connected to the third bar 48, will also be partially operated, but the third lever 44 of the sixth register wheel will be fully operated by the combined action of the bar 48 and the yoke frame, and the third pin 16 below the one which is in engagement with the stop 18 will be pushed to operative position. At the same time the releasing lever 99 co-operating with the sixth register wheel, will be operated and will restore the operative pin 16 to inoperative position, thus releasing the register wheel and leaving it free to turn under the impulse derived from its frictional connection with the continuously rotative shaft 11.

It will be observed that if the contact 199 were to be held in engagement with the contact 200, the fourth pin 16 in the sixth register wheel would soon come into engagement with the operated lever 44 and stop the rotation of the wheel, at least temporarily. It is desirable, therefore, that the lever 44 be quickly restored to normal position. This is one of the principal functions of the electro magnet 221, which is energized at the same instant as the digit selecting and denomination selecting electro-magnets, with the result that its armature 220 is actuated. The armature 220 draws the yoke bar 219 toward the back of the machine by means of the link 222, thus moving all of the hook-arms 210 toward the rear of the machine, thus releasing the operated arm 192 and for the moment rendering all of the hook arms 210 inoperative in connection with their respective arms 192. When the arm 192 is released, it is immediately restored to normal position by its spring 194, thus breaking the circuit. As all three of the magnets are energized at the same time, their armatures are all actuated at practically the same instant. It will be readily understood, therefore, that the contacts 199 and 200 are in engagement for only a very brief interval of time so that the motion of the setting lever 44 is practically in the nature of a blow, said lever making a quick working stroke and instantly returning to normal position under the impulse of springs 59 and 95. In practice the contacts 199 and 200 are separated by the automatic operation of the electro-magnet 221 and its connections much more quickly than they could be separated by the return of the key-lever to normal position. It will therefore be understood that the length of time during which said contacts are in engagement is entirely independent of the rapidity with which the key lever may be operated. It is practically impossible to operate the key lever rapidly enough to separate the contacts before they are automatically separated; and even if the key were depressed and held down, the contacts would nevertheless be instantly separated. In order that the mechanism of the typewriter may operate properly, it is necessary that a second key be not depressed until after the preceding key has returned to normal position or nearly so. This is necessary partly because of the bunching of the type bars, which results from depressing two keys at once, and also it is necessary in order that the escapement mechanism which controls the step-by-step feed of the carriage may operate. In case two keys are depressed at about the same time, two of the arms 192 would be depressed. The effect of this on the adding attachment would be that whichever of the contacts 199 first engaged its co-operating contact 200 would close a circuit, energizing three electro magnets, including the electro magnet 221; the yoke bar 219 would instantly be operated and both of the arms 192 would be released from connection with their respective key levers. Unless the two key levers were depressed exactly together, only one of the contacts 199 would have time to engage a contact 200, and only one of the digit selecting magnets 71—79 would be energized.

It will be observed that the depression of a numeral key in the typewriter to write a digit in the adding column has no effect upon the adding machine whatever, except to cause one of the digit selecting frames and one of the denomination selecting frames to make the short quick motion which has been described and which has the effect of resetting the operative pin 16 of one of the wheels and setting into operative position another pin 16 in the same wheel. Attention has been called to the fact that this operation is performed much more quickly than it is possible to operate the keys of the typewriting machine.

When the key "3" is operated, the typewriter carriage is moved a single letter space, which brings the contact pin 304 into engagement with the contact piece 277. The lever 340 being in its second position, the contact piece 277 is not connected to any denomination selecting magnet, and the typewriting machine is therefore for the time being disconnected from the adding machine. The operator may, therefore, strike the comma key, the space bar, or any other character key, when the carriage will move another step and bring the pin 306 into engagement with the contact piece 276, which is electrically connected with the denomination selecting magnet 85. The operator then strikes the "5" key, thus setting the fifth register wheel into operation to add five, and the carriage moves another step. The operator strikes the "2" key and the "8" key and then writes the period, the adding machine being at that moment disconnected from the typewriting machine, and then strikes the "6" and "5" keys in succession. The several keys may be struck as rapidly as the mechanism of the typewriting machine will admit of, for, as has been pointed out above, the operation of the setting mechanism of the adding machine is much more rapid than the typewriting mechanism. If the keys be struck in rapid succession, the register wheels will be set in motion one after another and it may easily happen that several of the register wheels will thus be in motion at once, but this does not interfere with the correct operation of the mechanism, as has been pointed out in the description of the adding machine. It will be understood that if the typewriting machine be operated in the ordinary way, two successive strokes of the keys will never write figures in the same denomination unless between such two successive strokes the carriage of the typewriting machine be first drawn back toward the right and re-adjusted in the same letter space position and the line space mechanism of the typewriting machine be also operated. The speed of the shaft 11 is so regulated that any wheel would have completed its motion and would have been again arrested by the stop 18 before it would be possible to thus re-adjust the typewriter carriage and impart the line space feed to the paper. If the shaft 11 be caused to turn thirty times a minute, or in other words, to make one half of a rotation per second, then a little less than a second will be required for the wheel to turn through nine spaces, or in case of "9" being added on a wheel at the same time that the wheel is receiving an additional unit by transfer from the next wheel of lower denomination, said register wheel will move through ten spaces, which will require just a second. It has been found by experiment that it is not practicable to space the platen and restore the carriage of the typewriting machine and depress a key within so brief a space of time. It will thus be seen that I have provided for use in connection with a typewriting machine, an adding machine which is capable of a rapidity of operation greater than the typewriting machine is capable of and yet in which the mechanism moves comparatively slowly and without jar or shock. The only parts which move quickly are the levers 44 and the pins 16, and these parts are so light and move through so short a distance that the quickness of their motion is practicable and not an objection.

It will be observed that the hook-arms 210 are connected to the key levers 137 at only a short distance from the fulcra of said levers and these hook-arms have no other work to do than to depress the light arm 192 through a small fraction of an inch. The amount of extra work which this imposes on the key levers is imperceptible. The contact devices connected to the paper carriage, are entirely automatic in their action and impose no other work upon the paper carriage than that due to the slight friction of the contact pins across the face of the insulating block 283.

In case it is desired to temporarily disconnect the typewriting machine from the adding machine, as for example, in writing totals, this is readily done by breaking the electric circuit by means of the switch 247. The numeral keys of the typewriting machine are ordinarily arranged to print other characters than numerals when the case shift key is depressed, and under these conditions the adding machine is automatically disconnected by the switch 250 which has been described. Inasmuch as the circuit controllers connected to the paper carriage do not interfere with the movement of the carriage back and forth nor impose upon it a perceptible amount of additional work; inasmuch as the key-controlled circuit controllers impose no perceptible amount of additional work on the numeral keys; inasmuch as the adding machine may be temporarily disconnected from the typewriting mechanism by the switch key 247; inasmuch as said adding machine is automatically disconnected by a depression of the case shift key; inasmuch as the adding machine may be entirely disconnected from the typewriting machine by merely removing the insulating blocks 283 and 236; and inasmuch as the adding machine imposes no limitations on the speed with which the typewriting machine may be operated;—in view of these considerations, it is thought that it is not too much to say that I have provided an adding attachment for a typewriting machine which does not interfere in any way whatever with the operation of the typewriting machine as such. When the adding machine is in operation, the typewriter operator has nothing more to do nor anything more to think about than he would have if the adding machine were not in use. So long as the typewriting machine is operated correctly and in the ordinary manner, the adding machine will add the column of figures altogether automatically.

The register wheels are turned to zero when desired by the same means which are used for turning the wheels in the operation of addition and in transferring; that is to say, by the power derived from the rotary shaft 11 through the friction devices which have been described, and by appropriately setting the digit determining pins 16. I have provided means whereby upon the depression of the zero key 375, the entire operation of setting the wheels to zero and restoring the mechanism to position to begin the addition of a new column of figures, is performed automatically by power derived from the motor 28. The zero setting mechanism is best shown in Figs. 3, 7 and 25 to 32 inclusive. A bar 376 extends nearly the entire length of the machine above the series of register wheels and is supported by pins 377 and 378 rigidly secured to the vertical plates 7 and 9 respectively, and loosely engaging holes in the ends of said bar 376. The bar 376 passes loosely through an opening provided for the purpose in the vertical plate 8. Another bar 379 extends parallel to the bar 376 and adjacent the series of resetting levers 99. The bar 379 passes loosely through an opening provided for the purpose in the plate 8 and is slidably supported in slots 380 in the plates 45', (Fig. 11). The bars 376 and 379 are rigidly connected by a yoke bar 381 secured to said bars 376 and 379 by screws 382. The frame, comprising the bars 376, 379 and 381, has a limited reciprocating motion endwise of the machine and is normally held in its left-hand position by a tension spring 383 connected at one end to a post 384 projecting from the bar 376 and at the other end to the vertical plate 8 and by another spring 383', connected at one end to the bar 381 and at the other to frame plate 8. A bell crank lever 385 is pivoted at 386 to a post 387 projecting inwardly from and rigidly secured to the end plate 9 and has one of its arms in engagement with the yoke bar 381. The other arm 388 of said bell crank lever is provided with a flat portion 389 which is adapted to be engaged by the stem 390 of the zero key 375. The stem 390 is slidably mounted in a lug 391 secured to the vertical plate 8. Said stem 390 is shown as a round rod and has a pin 392 projecting from one side thereof and adapted to slide in a slot 393 in said lug 391 to prevent the key stem from turning in its bearing. Motion of the arm 388 in an upward direction is adjustably limited by a set screw 394 threaded into a projection 395 from the lug 391 and held by a lock nut 396. Downward motion of said arm 388 is adjustably limited by a set screw 397 threaded through a lug 398 secured to the frame plate 8. It will be perceived that a depression of the zero key 375 will result in sliding the bars 376 and 379 to the right. The bar 379 is provided with a series of pins 399, one of said pins being in position to engage each of the releasing levers 99. When the key 375 is depressed and the bar 379 is moved to the right, the pins 399 operate the levers 99 and reset to inoperative position all of the pins 16 which are in engagement with the stops 18, thus releasing all of the register wheels and leaving them free to turn with the shaft 11. The appropriate pins are set to operative position by a series of arms or levers 400 pivoted to the bar 376, as by headed screws 401. Each of the arms 400 is drawn toward the right by a spring 402 connected at one end to said arm and at the other end to a pin 402' projecting from the bar 376. The springs 402 normally hold the levers 400 against a series of stop pins 403 projecting from the bar 376. Each of the arms 400 projects inwardly adjacent the flange 14 of one of the register wheels. Said arms are each formed with a flat portion 404, the surface of which when the parts are in their normal positions, is approximately parallel to said flange 14, and a lug 405 projecting at right angles to said flat portion 404 in the direction of the flange 14. The flange 14 is formed with two notches 406, each adjacent to a pin 16. When the bar 376 is drawn to the right by the depression of the key 375, if a notch 406 is opposite the lug 405, said lug enters said notch, and the flat portion 404 presses the adjacent pin 16 to operative position and the engagement of the lug 405 with the edge of the notch 406, prevents the wheel 10 from turning with the shaft 11. If the register wheel is not in such position when the key 375 is depressed, the lug 405 will engage the flange 14, being pressed against said flange by the tension of the spring 402. The register wheel will then turn with the shaft 11 until the notch 406 reaches the lug 405, when the spring 402 will draw the arm 400 to the right, the lug entering the notch 406 and stopping the wheel and the flat portion 404 pressing the pin 16 to operative position. In order to prevent the pin 16 from being thrown too far by the arm 400, the wiper 131 is formed with an extension 407 which is in position to arrest the pin 16 when so operated.

It will be seen that it is necessary that the frame including the bar 376 be held in its right-hand position long enough to insure that all the wheels shall have time for their respective notches 406 to reach and be arrested by the lugs 405. To this end it is necessary that the parts be held in this position for at least half of a revolution of the shaft 11. The parts are so held and are released automatically by the following means:—An arm 408 is pivoted to the bell crank arm 388 at 409 and is guided in a slot 410 in a post 411 projecting from the frame plate 8. The arm 408 is drawn toward the end of the slot 410 by a spring 412 connected at one end to said arm 408 and at the other to the frame plate 8. The arm 408 is provided with a shouldered or hooked portion 413 adapted, when the arm 388 is depressed, to engage the post 411 and hold the arm 388 in depressed position. The hook-arm 408 is automatically released by an arm 414 loosely supported on a rod 415 between collars 416. The rod 415 is supported by the frame plates 8 and 9. As best shown in Figs. 3 and 5, the collars 416 are cut away at 417 to leave the lever 414 free to oscillate in a right and left-hand direction, but said collars prevent the lever 414 from having a twisting motion. The lever 414 rests in a notch 418 formed in the arm 408 and the said arm is drawn downwardly and to the left by a spring 419, connecting said lever to the frame plate 8. The notch 418 is wider than the lever 414 and the spring 419 tends to hold said arm against the bottom of the notch and at the left-hand side thereof. When the parts are in their normal position, the free end of the lever 414 is thus held above the left-hand end of a double worm 420 fixed on the shaft 11 as by a set screw 421. When the key 375 is depressed, the lever 414 is drawn to the bottom of one of the worm grooves by its spring 419. The lever 414 is moved toward the right by the engagement of its free end with the worm 420 and the parts are so proportioned that after the shaft 11 has made half a revolution, the lever 414, engaging the right-hand side of the notch 418, will draw the arm 408 to the right, disengaging the shoulder 413 from the post 411, thus releasing the lever arm. In case the key 375 is held down by the operator, the end of the lever 414, after escaping from the worm, drops low enough to engage the solid end of the worm, thus preventing it from moving back and forth as the ends of the threads pass it. This prevents the arm 408 from becoming locked again after it is once released. The frame comprising the bars 376 and 379, will then be thrown to the left by its springs, and the stop pins 403 will engage the levers 400 and withdraw the lugs 405 from the notches 406. The register wheels are thus released from said lugs 405 and turn until they are arrested in a manner which will now be described.

It will be observed that in turning from the position in which a pin 16 is set by one of the levers 400 to the position in which that pin could be arrested, the register wheel must turn through more than half a revolution. It is obvious therefore that at least one of the pins 116 will pass the cam 115 and displace the transfer lever 106. The pin which is set by the lever 400 will therefore not engage the stop 18 but will go on past said stop and engage the cams 119 and 118, thus restoring the stop 18 and setting the next succeeding pin 16 to operative position. This being the case, it is obvious that in all of the register wheels, except the first, it is necessary that the notch 406 be placed adjacent that pin 16 which is next in advance of the zero pin; in other words, the pin which corresponds to the digit "9," as shown in Fig. 13. As the stop 18$^a$ of the wheel of lowest denomination is not movable, it is necessary that in this wheel the notch 406 be adjacent the zero pin, as shown in Fig. 14.

The switch 322, to which reference has been made hereinbefore, has for its purpose to break the circuits of the digit selecting and denomination selecting electromagnets during the operation of setting the wheels to zero and means are provided for opening this switch when the zero key 375 is depressed, for automatically holding said switch open until the zero setting operation is complete, and for then closing said switch and holding it closed until the key 375 is again depressed. The wires 321 and 323 are attached to binding posts 422 and 423, which are supported in a piece of insulating material 424 secured to the frame plate 9. The binding posts 422 and 423 are connected to contact pieces 425 and 426 respectively and the switch 322 consists of a forked flat spring adapted to be pressed against said contacts 425 and 426 to electrically connect the same. The spring 322 is fixed by means of a screw 427 to a block of insulating material 428 carried by a lever 429 which is pivoted on a shouldered screw 430 threaded into a post 431 projecting inwardly from the frame plate 9. The lever 429 is held in its normal position with the spring 322 pressed against the contact pieces 425 and 426 by means of a coiled spring 432 connected at one end to said lever and at the other end to the frame plate 9. The lower arm of the lever of the bell crank 385 is extended and formed as shown at 433, and is adapted, when the key 375 is depressed, to engage the lever 429 and oscillate the same, withdrawing the spring 322 from engagement with the contact pieces. A latch 434 is mounted on the lever 429 to slide longitudinally thereof by screws 435 and 436 passing loosely through elongated slots 437 in said latch. The screw 436 is formed into a post to which is attached one end of a spring 438, the other end of which is attached to a lug 439, rising from the latch 434. The end of the latch 434 projects beyond the end of the lever 439 and the end of said latch is formed with a cam portion 440 and an abrupt portion 441. A double worm 444 is fixed on the shaft 11, and the end of the latch 434 normally stands a little to the left of the left-hand end of said worm. When the key 375 is depressed and the lever 429 thereby oscillated, the latch 434 is slid against the tension of the spring 438 by engagement of the cam 440 with the threads of the worm 444 until the latch escapes past the end of the worm to the position shown in Fig. 31. The lever 429 is held in this position by the end portion 433 of the bell crank lever 385 as long as said bell crank is held in its depressed position by the hook arm 408. When the bell crank is released and the end portion 433 is withdrawn from the lever 429, the abrupt portion 441 of the latch 434 is pressed by the spring 432 into engagement with the threads of the worm 444. As the shaft 11 rotates, the latch 434 follows the threads of the worm until it again escapes past the worm to the left, when the spring 322 is again brought into engagement with the contacts 425 and 426. The worm 444 is so designed as to hold the switch 322 open long enough to permit the pins 16 which have been set to operative position by the levers 440, to reach the levers 106 and arrest the register wheels in the manner which has been described.

I utilize the lever 429 to sound an alarm to indicate when the zero setting operation is complete. A bell 445 is supported from the frame plate 8 on a post 446. A bell hammer 447 is carried by a hammer arm 448 pivoted at 449 to a post 450 projecting inward from the frame plate 9. The hammer arm 448 is provided above its pivotal point with a shoulder 451 adapted to be engaged by a pawl 452 pivoted at 453 to a lug 454 depending from the end of the lever 429. The pawl 452 is held in its normal position by a spring 452' and is prevented from dropping too far by the engagement of a shoulder 455 formed on said pawl 452 and engaging the lever 429. When the lever 429 is oscillated by the end 433 of the bell crank lever 385, the pawl 452 drops in front of the shoulder 451 and when the lever 429 is returning to normal position, the pawl 452 engages said shoulder and oscillates the hammer arm 448 until the pawl 452 escapes past the shoulder 451, when the hammer 447 strikes the bell 445 and this indicates to the operator that the zero setting operation is complete.

A series of arc-shaped plates 456 rest in notches 457 in the upper edges of sliding bars 458, 459 and 460. In their normal positions the plates 456 are each parallel with the lower part of the web portion 12 of one of the register wheels 10 and at such a distance from said register wheel as to serve as a means for arresting the pins 16 and preventing them from being driven too far by the levers 44. The bars 458 and 460 have at their right-hand ends projections 461 (Fig. 25) which fit loosely in slots in the frame plates 45'. The bar 459 projects through a suitable opening in the frame plate 8 and has a pin 462 to which is connected a coiled spring 463, the other end of which is connected to the frame plate 9. Said spring tends to draw the bar 459 and the parts connected thereto toward the right-hand end of the machine. Motion of such parts toward the right is limited by shoulders 461' on bars 458 and 460 engaging frame plate 47 (Figs. 6 and 25). The bars 458 and 460 have projections at their left-hand ends adapted to slide in notches 464 in the plate 45' and the bar 459 is supported at its left-hand end in a notch or slot 465 formed in the top of the plate 45'. Two rods 466 and 467 pass through openings in each of the plates 456 and are rigidly connected to at least one of said plates by set screws 468 threaded into a lug or hub 469 formed on said plate 456, said set screws engaging said rods 466 and 467. Said rods are slidable in suitable openings in the frame plates 7 and 8. The rods 466 and 467 prevent the plates 456 from becoming displaced from the notches 457. It will be seen that the bars 458, 459 and 460, the rods 466 and 467 and the plates 456 together constitute a slidable frame. Said frame is so mounted as to have a limited sliding movement lengthwise of the machine. Said frame is normally held in its right-hand position by the spring 463 but is pushed toward the left by a lever 470 pivoted at 471 to a post 472 projecting from the frame plate 8. One end of the lever 470 engages the end of the bar 459 and the other end engages a lug 473 projecting downward from the bar 379. As shown, the lug 473 forms part of a block 474 secured to the bar 379 as by a screw 475. When the bar 379 is moved to the right by the depression of the key 375, the lug 473 operates the lever 470, which pushes the bar 459 to the left, thus moving all of the plates 456 toward their respective register wheels and restoring to inoperative position any pins 16 which may have become displaced by any means.

A handle 459' attached to the bar 459 projects through the left-hand end of the casing. In case any pins 16 have become accidentally displaced and it is desired to replace the same without resetting the machine to zero, such pins may be reset by pulling said handle 459' and thus pressing the several plates 456 against their respective register wheels.

The operation of the zero setting mechanism has been explained above but will be recapitulated.

When it is desired to set the wheels to zero, the switch 360 is closed, thus starting the motor. The zero key 375 is then depressed until the shoulder 413 of the hook arm 408 is caught beneath the post 411. The end 433 of the bell crank lever 385 operates the lever 429 and breaks the connection between the adding mechanism and the typewriting machine. The bell crank lever 385, by its engagement with the yoke bar 381, pushes the bars 376 and 399 to the right and through the lever 470 and the other parts which have been described pushes the plates 456 to the left, thus restoring to inoperative position any pins 16 that may have become displaced. The right-hand movement of the bar 379 results in the pins 399 of said bar operating the levers 99 and resetting those pins 16 which were in engagement with the stops 18, thus releasing the register wheels from said stops. The right-hand movement of the bar 376 results in the lugs 405 of the arms 400, which co-operate with any register wheels that may be already in zero position, entering the notches 406 of said wheels, setting the proper pin 16 to operative position and restraining the register wheel against rotation of the shaft 11. Those register wheels which are not in zero position have their flanges 14 engaged by the lugs 405 of their respective arms 400 until the notches 406 reach the lugs 405, when said lugs drop into said notches, thus arresting the motion of the wheels and the flat portions 404 of said levers setting to operative position the appropriate pins 16. Meanwhile the lever 414 has engaged the worm 420 and has been moving to the right, propelled by the threads of said worms. Said lever now engages the right-hand side of the notch 418 and presses the hook arm 408 out of engagement with the post 411, thus releasing the bell crank 385. The parts above referred to are then restored to normal position by the springs 383, 383' and 463. This withdraws the lugs 405 from the notches 406 and permits all of the register wheels to turn with the shaft 11 until the operated pin 16 of the wheel of lowest denomination engages its stop 18ª and the operative pins 16 of the other register wheels engage the cams 419 and 418, thus setting in each wheel the next succeeding pin and arresting the wheels at zero position. The movement of the bell crank lever 385 to normal position also releases the lever 429 and permits the spring 432 to draw the latch 434 into engagement with the threads of the worm 444. While the pins 16, which have been set by the levers 440, are turning toward the levers 106, the latch 434 is traversing the worm 444 and after the register wheels have been arrested at the zero position, said latch escapes from the said worm, the switch 322 is closed and the alarm notifies the operator that the operation of setting the wheels to zero is complete and that the machine is ready for further operation.

The adding machine may be provided with any suitable casing which may advantageously have the form shown in Figs. 1 and 2. I have shown in Fig. 1 a plate 476 attached to the casing as by screws 477 and having the sight openings 19 formed therein. I have also shown a rod 478 supported beneath the sight openings 19 by posts 479 fixed to the casing. Pointers 480, 481 and 482 are slidably mounted on said rod 478 and may be adjusted to positions between the sight openings 19 to aid in reading the total shown. As an electric motor always generates a certain amount of heat, the lower portion of the casing may be provided with ventilating openings 483. Handles 484 may be pivoted in ears 485 as shown, for convenience in handling the machine.

Electric connections, resembling in a general way those shown in the present case, between a typewriter and an adding machine are shown and claimed in my prior application filed November 1st, 1899, Serial No. 735,499. The electric circuits shown in said application Serial No. 735,449, are changeable for different styles of punctuation, and this feature is broadly claimed in that application. A multipole switch for changing the circuits for different styles of punctuation is shown and broadly claimed in my prior application, Serial No. 78,834, filed October 16th, 1901. A number of the features of invention shown in the present case are claimed more broadly in my two prior applications just referred to.

What I claim as new and desire to secure by Letters Patent, is:—

1. The combination of a series of registering elements of different denominations, each independently driven to add numbers by frictional contact, one friction member for each registering element being adapted to continue its movement after the other has been arrested.

2. The combination of a series of registering elements of different denominations, each independently driven to add numbers by frictional contact, one of the contacting members for each registering element being adapted to continue its movement after the other has been arrested, and selective controlling means for said registering elements.

3. The combination of a series of registering elements of different denominations, each independently driven to add numbers by frictional contact, one of the contacting members for each registering element being adapted to continue its movement after the other has been arrested; and means for controlling the movements of said registering elements through differential distances.

4. The combination of a series of registering elements of different denominations, each independently driven to add numbers by frictional contact, one of the contacting members for each of said registering elements being adapted to continue its motion after the other has been arrested; selective controlling means; and differential controlling means for said registering elements.

5. The combination of a series of registering elements of different denominations, each independently driven to add numbers by frictional contact, one of the contacting members for each of said registering elements being adapted to continue its movement after the other has been arrested; and a series of keys and connections for controlling the motion of said registering elements.

6. The combination of a series of register wheels; a group of keys common to said register wheels; means whereby any of said keys may control any of said wheels; and frictional driving means for operating said register wheels to add numbers.

7. The combination of a group of keys; a carriage; a series of register wheels controlled selectively by said keys and carriage; and frictional driving means for operating said register wheels to add numbers.

8. The combination of a rotary shaft and a series of register wheels of different denominations mounted on said rotary shaft and operatively connected thereto by frictional contact.

9. The combination of a series of register wheels of different denominations; a rotative driver; friction means connecting said rotative driver to each of said register wheels independently; and means for controlling the turning of said register wheels under the impulse of said driver to add numbers.

10. The combination of a rotative driver; a series of register wheels independently frictionally connected to said driver; means for controlling the movements of said register wheels under the impulse of said driver; and transfer devices between said register wheels.

11. The combination of a rotative driver; a series of register wheels independently frictionally connected to said driver; key controlled differential devices for controlling the movements of said register-wheels under the impulse of said driver; and transfer devices between said register wheels.

12. The combination of a rotative driver; a series of register wheels independently frictionally connected to said driver; a group of keys common to said register wheels; and selective means co-operating with said keys to selectively control the movements of said register wheels under the impulse of said driver.

13. The combination of a rotative driver; a series of driven members, each independently frictionally connected to said driver; and means for allowing to any selected driven member differential movements under the impulse of said driver.

14. The combination of a continuously rotative driver; a series of driven members, each independently frictionally connected to said driver and each having differential feed movements; and differential devices for controlling the movements of said driven members selectively.

15. The combination of a continuously rotative driver; a series of driven members, each independently frictionally connected to said driver, and each having differential feed movements; devices for controlling the movements of said driven members selectively; and keys for controlling said differential devices.

16. The combination of a continuously rotative driver; a series of driven members, each independently frictionally connected to said driver and each having differential feed movements; and keys for controlling the movements of said driven members under the impulse of said driver.

17. The combination of a continuously rotative driver; a series of driven members frictionally connected to said driver; a series of keys for selectively controlling the movements of said driven members under the impulse of said driver; and selecting means for placing any selected driven member under the control of the keys.

18. The combination of a continuously rotative driver; a series of driven members frictionally connected to said driver; a series of keys for selectively controlling the movements of said driven members under the impulse of said driver; and a carriage for connecting said driven members one after another to said keys.

19. The combination of a continuously rotative driver, a series of registering elements of different denominations having independent frictional connection with said driver, and digit determining means co-operating with each of said registering elements.

20. The combination of a continuously rotative driver, a series of registering elements having independent frictional connection with said driver, and means for allowing to any selected element a differential degree of freedom of motion under the impulse of said driver.

21. The combination of a rotary shaft; a series of register wheels mounted on said shaft and having independent frictional connection therewith; settable stop devices for holding said wheels against rotation but settable to allow to any of said wheels a freedom of motion with said shaft through differential distances.

22. The combination of a shaft, a registering wheel mounted loosely thereon, a friction disk fixed to said shaft on one side of said registering wheel; another friction disk slidably mounted on said shaft and engaging said registering wheel on its other side; and a spring pressing said slidable disk toward said wheel.

23. The combination of a shaft, a series of disks fixed to said shaft; a series of disks alternating with said fixed disks and slidably mounted on said shaft; a series of register wheels, one of said wheels being loosely mounted on said shaft between each fixed disk and its adjacent slidable disk; and a series of compression springs pressing said slidable disks against said register wheels.

24. The combination of a rotative driver, register wheels having frictional connection with said driver, and a series of settable stops carried by said register wheels.

25. The combination of register wheels, a driver adapted to actuate said register wheels by frictional contact, and settable stops carried by said register wheels.

26. The combination of a continuously rotative driver, register wheels having frictional connection with said driver, and a series of settable stops carried by said register wheels.

27. The combination with a series of register wheels each carrying a series of settable stops, of a series of keys and connections whereby any key may set its appropriate stop in any of said register wheels.

28. The combination of a register wheel having settable stops mounted therein, means for setting said stops, and means independent of the wheel for limiting the setting movement of said stops.

29. The combination of an adding wheel; means for actuating said wheel; a settable stop mounted in said wheel and zero setting mechanism for automatically setting said stop to arrest said wheel at the zero position.

30. The combination of a series of adding wheels; settable digit determining members mounted in said wheels; and means for automatically selecting and setting the appropriate digit-determining members carried by the several wheels to set said wheels to zero.

31. The combination of a series of register wheels; settable digit determining means carried by said wheels; digit selectors and denomination selectors for setting said digit determining means; and resetting means for said digit determining means operated by said denomination selectors.

32. The combination of a series of register wheels, a continuously rotative driver adapted to rotate said register wheels, and settable digit determining means carried by said register wheels.

33. The combination of a rotative driver, a series of register wheels having independent frictional connection with said driver, and settable limiting means carried by each of said register wheels, and a stop co-operating with said settable limiting means.

34. The combination of a series of register wheels, a continuously rotative driver adapted to rotate said register wheels, settable limiting means carried by each of said register wheels, and a movable stop co-operating with said settable limiting means.

35. The combination of a series of register wheels, a continuously rotative driver for said register wheels, and settable members carried by said register wheels and adapted to control the rotation of said wheels under the impulse of said driver.

36. The combination of a series of register wheels each independently frictionally driven, settable limiting means carried by each of said register wheels, and a movable stop co-operating with said limiting means.

37. The combination of a series of register wheels each independently frictionally driven, and settable members carried by said register wheels, and adapted to control the rotation thereof.

38. The combination with a series of register wheels, each carrying a series of settable stops, of a rotative driver common to all of said wheels, and means adapted to permit said driver to rotate one or more of said wheels at a time.

39. The combination with a series of register wheels carrying a series of settable stops, of a rotative driver common to all of said wheels, and means including keys adapted to permit said driver to rotate one or more of said wheels at a time.

40. The combination with a series of register wheels carrying a series of settable stops, of a rotative driver common to all of said wheels, and means including a carriage adapted to permit said driver to rotate one or more of said wheels at a time.

41. The combination with a series of register wheels carrying a series of settable stops, of a rotative driver common to all of said wheels, and means including keys and a carriage adapted to permit said driver to rotate one or more of said wheels at a time.

42. The combination with a series of register wheels mounted upon a rotative driver and each carrying a series of settable stops, of means adapted to permit said driver to rotate one or more of said wheels at a time.

43. The combination with a series of register wheels mounted upon a rotative driver and each carrying a series of settable stops, of means including a carriage to permit said driver to rotate one or more of said wheels at a time.

44. The combination with a series of register wheels mounted upon a rotative driver and each carrying a series of settable stops, of means including keys to permit said driver to rotate one or more of said wheels at a time.

45. The combination of a series of register wheels carrying a series of settable stops, a rotative driver common to all of said wheels, means whereby said driver may rotate one or more of said wheels to add, and means by which said driver may also rotate one or more of said wheels to transfer.

46. The combination of a register wheel; means for driving said register wheel by frictional contact, one of the contacting members being adapted to continue its motion after the other has come to rest; and settable stops carried by said register wheel.

47. The combination with a series of register wheels carrying a series of settable stops, of a rotative driver common to all of said wheels, and means governing said wheels selectively.

48. The combination with a series of register wheels carrying a series of settable stops, of a rotative driver common to all of said wheels, and a selecting device co-operating with said settable stops.

49. The combination with a series of register wheels carrying a series of settable stops, of a rotative driver common to all of said wheels, and means including a selective device adapted to permit said driver to rotate one or more of said wheels at a time.

50. The combination with a series of register wheels carrying a series of settable stops, of a driver common to all of said wheels, and means adapted to permit said driver to actuate one or more of said wheels at a time.

51. The combination with a series of register elements carrying a series of settable stops, of a driver common to all of said elements, and means adapted to permit said driver to actuate one or more of said elements at a time.

52. The combination with a series of registering elements carrying a series of settable stops, of a driver common to all of said registering elements, and a selective device co-operating with said settable stops.

53. The combination with a series of register wheels carrying a series of settable stops, of a rotative driver common to all of said wheels, and means including a selective device adapted to permit said driver to rotate one or more of said wheels at a time.

54. The combination with a series of register wheels carrying a series of settable members, of a driver common to all of said register wheels, and a selective device co-operating with said settable members.

55. The combination with a series of registering elements carrying a series of settable members, of a driver common to all of said registering elements, and means including a selective device adapted to permit said driver to actuate one or more of said registering elements at a time.

56. The combination with a series of registering elements carrying a series of settable members, of a driver common to all of said elements, and means including a group of keys and a selective device governed thereby adapted to permit said driver to actuate one or more of said elements at a time.

57. The combination with a series of registering elements carrying a series of settable members, of a driver common to all of said elements, a selective device for said elements and a group of keys controlling said selective device and said elements.

58. The combination with a series of registering elements each carrying a group of settable members, of a driver common to all of said elements, a selective device co-operating with said settable members, and a group of keys controlling said selective device.

59. The combination with a series of registering elements, each carrying a series of settable members, of a driver common to all of said elements, and means including a group of keys and a selective device governed thereby adapted to permit said driver to actuate one or more of said elements at a time.

60. The combination with a series of registering elements each carrying a series of settable members, of a rotative driver common to all of said elements, a group of keys controlling said members, and a selective device controlled by said keys.

61. The combination with a series of register wheels carrying a series of settable stops, of a rotative driver common to all of said wheels, and a group of keys common to all of said register wheels and governing the action of said driver upon said wheels.

62. The combination with a series of registering elements carrying a series of settable stops, of a driver common to all of said elements, and a group of keys common to all of said registering elements and adapted to control said stops and the action of said driver upon said elements.

63. The combination with a series of register wheels mounted upon a rotative driver and each carrying a series of settable members, of a group of figure keys common to all of said register wheels and governing said settable members.

64. The combination with a series of register wheels each carrying a series of settable stops, of means common to all of said wheels and adapted to rotate said wheels one or more at a time, and a group of keys governing such rotation.

65. The combination with a series of register wheels each carrying a series of settable stops, of means adapted to rotate said wheels one or more at a time, and means governing said wheels selectively.

66. The combination with a series of register wheels mounted upon a common shaft and each carrying a series of settable stops, of means adapted to rotate one or more of said wheels at a time, a carriage governing the selection of said wheels, and a group of keys that control said carriage.

67. The combination of a rotative driver; a series of register wheels mounted on said rotative driver and each carrying a series of settable stops; means for rotating said driver; a group of keys common to all of said register wheels; and means controlled by said keys for controlling said stops.

68. The combination with a series of register wheels carrying a series of settable stops, of a rotative driver, means for rotating said driver, and means co-operating with said settable stops for controlling the action of said driver upon said wheels without affecting the rotation of said driver.

69. The combination of a series of register wheels carrying a series of settable stops, a rotative driver common to all of said wheels, a group of keys, and means controlled by said keys for controlling said stops to govern the action of said driver upon said wheels without affecting the rotation of said driver.

70. The combination of a group of keys, a driver, and a series of register wheels each bearing a series of settable stops controlled by said keys and governing the action of said driver upon the said wheels without affecting said driver.

71. The combination with a series of register wheels each carrying settable stops, of a driver common to all of said register wheels, keys co-operating with said settable stops to control the rotation of said wheels under the impulse of said driver, and transfer devices also controlling the rotation of said wheels under the impulse of said driver.

72. The combination of a series of register wheels each carrying a series of settable stops, a series of keys adapted to control said settable stops, a carriage controlling the connection between said keys and said settable stops, and transfer devices also controlling said stops.

73. The combination of a series of register wheels each carrying a series of settable stops, a group of keys operatively connected to said settable stops, and a carriage controlling the connection between said keys and said stops.

74. The combination of a series of adding wheels normally idle but tending to turn; a movable carriage; and means controlled by said carriage for releasing said wheels one at a time.

75. The combination of a series of adding wheels normally idle but tending to turn; means for holding said wheels against rotation; and a movable carriage for controlling said holding means.

76. The combination of a series of adding wheels normally idle but tending to turn, a group of keys common to all of said adding wheels, and key controlled means for releasing said adding wheels one at a time.

77. The combination with a series of adding wheels normally idle but tending to turn, of key controlled means controlling the rotation of said adding wheels selectively.

78. The combination of a series of adding wheels normally idle but tending to turn, and a group of keys and a carriage controlling the rotation of said adding wheels.

79. The combination of a series of adding wheels, means tending to rotate said adding wheels, typewriting mechanism having keys and a carriage, and arresting means for said adding wheels controlled by said keys and carriage.

80. The combination with a typewriter including a series of figure keys and a carriage, of a series of adding wheels normally idle but tending to turn, arresting means for said wheels controlled by the keys of said typewriter, and selecting means controlled by said carriage.

81. The combination with typewriting mechanism including a series of figure keys and a carriage, of a series of adding wheels normally idle but tending to turn; differential arresting means for said wheels controlled by said keys; and selecting means controlled by said carriage.

82. The combination with a typewriting mechanism including a series of figure keys, of a series of adding wheels normally idle but tending to turn, arresting means and selecting means for said wheels controlled by said figure keys.

83. The combination of a continuously rotative driver, a series of register wheels engaged by said rotative driver, and means for rendering said driver operative to turn any of said register wheels.

84. The combination of a continuously rotative driver, a series of register wheels, a group of keys, and means whereby any key may render the said driver operative to turn any of said register wheels.

85. The combination of a continuously rotating shaft, a series of register wheels mounted on said shaft, and digit determining means settable to allow any selected register wheel to turn with said shaft through differential distances.

86. The combination of a continuously rotative driver, a series of registering elements each having differential movements and having independent connection with said driver, and selective coupling and uncoupling means for controlling the connection between the several registering elements and said driver.

87. The combination of a continuously rotative driver; a series of register wheels; a group of keys; and means whereby any key may render said driver operative to turn any of said register wheels through a distance depending on the particular key depressed.

88. The combination of a series of register wheels, a continuously rotative driver adapted to rotate any of said register wheels, in combination with a group of keys and a carriage for controlling the movements of said register wheels under the impulse of said driver.

89. The combination with a continuously rotative shaft and a series of register wheels mounted thereon and adapted to be rotated thereby, of means for controlling the rotation of said register wheels by said shaft.

90. The combination of a continuously rotative shaft, a series of register wheels, and selective means for causing any selected register wheel to turn under the impulse of said shaft through differential distances.

91. The combination of a register wheel, driving means engaging said register wheel, and means for controlling the rotation of said register wheel through differential distances without affecting said driving means.

92. The combination of a register wheel, a rotative driver engaging one portion of said wheel, and means engaging another portion of said register wheel to control the motion of said register wheel through differential distances without affecting the rotation of said driver.

93. The combination of a series of register wheels of different denominations, a rotative driver engaging one portion of each of said register wheels, and controlling means engaging another portion of each of said register wheels.

94. The combination of a register wheel, means for applying power at one portion of said register wheel, and means operative at another portion of said register wheel to control the motion of said register wheel through differential distances without affecting said power-applying means.

95. The combination of a source of power, a series of register wheels of different denominations, means for applying said power at one portion of each of said register wheels, and controlling means operative at another portion of each of said register wheels.

96. The combination with register wheels, of driving means connected to the said register wheels by frictional contact, and transfer devices for controlling the motion of said wheels under the impulse of said driving means.

97. The combination of a plurality of register wheels, continuously rotative driving means for said register wheels, and transfer means actuated by a register wheel of lower denomination to couple a wheel of higher denomination to said driving means.

98. The combination of a plurality of register wheels; a series of stop pieces movably mounted in each wheel; means, including a series of keys, for setting said stop pieces; and transfer devices also adapted to set said stop pieces.

99. The combination of register wheels, settable stops carried by said wheels, and transfer devices comprising means whereby one of said settable stops operates to set the next succeeding stop.

100. The combination with a series of register wheels, each carrying a series of settable digit determining members, of a stop for that settable member of a wheel of higher denomination which is in set position; means carried by a wheel of lower denomination for moving the stop out of the path of said member; and means operated by said member to move the next succeeding settable member to set position.

101. The combination with a plurality of register wheels, each carrying settable digit determining members, of transfer devices including means for setting said digit determining members.

102. The combination of a plurality of register wheels arranged side by side along a common axis; settable digit determining members carried by said register wheels; and transfer devices co-operating with said settable digit determining members.

103. The combination of a pair of register wheels arranged side by side along a common axis; settable digit determining members carried by said register wheels; a movable stop co-operating with said settable digit determining members of the wheel of higher denomination; means whereby the wheel of lower denomination may move said stop to transfer; and means for returning said stop to normal position.

104. The combination with a register wheel and a series of settable stops carried thereby, of means for setting said stops to operative position, and a wiper for returning said settable stops to inoperative position.

105. The combination with a pair of register wheels, each carrying settable arresting members, of stops co-operating with said arresting members when the same are in operative position; means whereby the wheel of lower denomination may move the stop of the wheel of higher denomination out of the path of said arresting members to transfer; and a wiper for restoring the arresting members to inoperative position.

106. The combination of a register wheel; settable arresting members carried by said register wheel; a stop adapted to co-operate with any of said arresting members which is in operative position; means for resetting to inoperative position that arresting member which is in engagement with said stop and setting to operative position the arresting member which corresponds to a digit to be added; and means, independent of the arresting members, for rotating said register wheel.

107. The combination of a series of register wheels each tending to rotate and carrying a series of settable stops, one stop of each series being out of normal position and in position to prevent such rotation; means by which any stop out of normal position may be replaced to normal position and another stop of the same series displaced out of normal position to allow the wheel to rotate a distance depending on the particular stop displaced.

108. An adding mechanism; a series of keys for controlling the same; and a timing device called into action by each of said keys when the same is depressed for limiting the length of time during which the adding mechanism is under the control of the key, irrespective of the speed with which the key is operated and returned to normal position.

109. The combination of a register wheel carrying a series of settable stops, a key, and key controlled means for setting said stops, with provision for automatically disconnecting said key from said setting means.

110. The combination of a register wheel carrying a series of settable stops, a key, and key controlled means for setting said stops, with provision for disconnecting said key from said setting means.

111. The combination of a series of register wheels, a series of keys, controlling means for said register wheels operated upon the depression of a key, and electrically controlled means for automatically disconnecting said controlling mechanism from said key.

112. The combination of a series of register wheels, a series of keys, and controlling means for said register wheels operated upon the depression of a key, and electrically controlled means for disconnecting said controlling means from said key.

113. The combination of a series of register wheels, settable digit determining members carried by said register wheels, means for setting said digit determining members upon the depression of a key, and means for disconnecting said setting means from said key.

114. The combination of a series of register wheels, settable digit determining members carried by said register wheels, a series of keys, means for setting said settable digit determining members upon the depression of a key, and means for automatically disconnecting said setting means from said key.

115. An adding mechanism comprising setting means; a series of keys for controlling the actuation of said setting means; and electrically controlled means for restoring said setting means to normal position immediately after the actuation thereof, independently of the further motion of the key.

116. A series of keys; setting means controlled by said keys at a predetermined point in the stroke thereof; and electrically controlled means for quickly restoring said setting means to normal position independently of the further motion of the key.

117. The combination of a series of registering elements; quick acting setting means controlling the several registering elements one at a time; slow acting means for operating the several elements independently; said registering elements being set in operation one at a time by said setting means and continuing in operation whether other registering elements are immediately set in operation or not.

118. The combination of a series of power impelled register wheels; means adapted to set one of said wheels in operation at a time, whether other wheels are then in motion or not, and a transfer device for transferring from one wheel to the next.

119. The combination with a series of registering elements, and keys for controlling the same; of timed operating means for said registering elements; and setting means having a timing device for controlling said setting means without reference to the speed with which the key is operated.

120. The combination with a series of registering elements, of means for operating said elements independently; and selective setting means for setting said registering elements in operation one at a time; said operating means being timed to act slowly and said setting means being timed to act and to return to normal position quickly.

121. The combination with typewriting mechanism comprising number keys and a movable carriage; of a series of adding wheels; means controlled by said carriage and keys for controlling said wheels selectively; and operating means for said wheels actuated by power independent of that applied to the typewriting mechanism and so timed as to utilize for turning the wheels the time spent in the movement of the carriage.

122. The combination of typewriting mechanism including a carriage, an adding mechanism connected thereto by electric circuits, circuit controllers operated by the figure keys of the typewriting mechanism, adjustable means for determining at what location in the line of writing the said circuit controllers shall be effective, and means for determining the length of time during which said circuit controllers shall be effective.

123. The combination of typewriting mechanism including a series of figure keys, electric circuits, circuit controllers operated by said figure keys, and means for determining the length of time during which said circuit controllers shall be effective.

124. The combination of typewriting mechanism including a series of figure keys, electric circuits circuit controllers operated by said figure keys, and means called into action by the depression of a key for disconnecting said circuit controllers from said keys.

125. The combination of typewriting mechanism including a series of figure keys; an adding mechanism; electrical devices controlled by said keys for actuating said adding mechanism, and means called into action by the depression of a key for disconnecting said keys from said devices.

126. The combination of a typewriting mechanism, including a carriage and a series of figure keys, an adding mechanism, electric circuits connecting said typewriting mechanism and adding mechanism, each of which contains two circuit controllers, one operated by a figure key and the other by the carriage, and a third circuit controller for determining the length of time during which said first mentioned circuit controllers shall be effective.

127. The combination with a typewriting mechanism including a carriage and figure keys; and an adding mechanism, of electric circuits connecting said mechanisms, each of said circuits containing three circuit controllers, one operated by a figure key and another by the carriage and the third operated when the other two are made effective.

128. The combination with a typewriting mechanism including a carriage and figure keys, and an adding mechanism, of electric circuits connecting said mechanisms, each of said circuits containing three circuit controllers, one operated by a figure key and another by the carriage and the third operated when the other two are made effective, said third circuit controller operating to limit the time during which the first two circuit controllers shall be effective.

129. The combination with a key, of an electric circuit controlled by said key; registering means controlled by said electric circuit; and a circuit controller for said circuit, also controlled by said circuit.

130. The combination with a series of keys, of electric circuits controlled by said keys; registering means controlled by said circuits; and circuit controlling means for said circuits also controlled by said circuits.

131. The combination with a series of keys, of electric circuits controlled by said keys and having a conductor in common; registering means controlled by said circuits; an electro-magnet in said common conductor; and circuit controlling means for said circuits controlled by said electro-magnet.

132. The combination with a series of keys, of a series of electric circuits, one for each key; registering mechanism controlled by said circuits; a controller for each of said circuits arranged to be operated by its appropriate key; and means controlled by any of said circuits for disconnecting a circuit controller from its key.

133. The combination with a series of keys, of a series of electric circuits, one for each key; registering mechanism controlled by said circuits; a controller for each of said circuits; a hook to connect each key to its circuit controller; and means controlled by said circuits for moving said hooks to inoperative position.

134. The combination of a series of registering elements; separate setting means for the several registering elements; a series of keys for controlling the actuation of said setting means; and means for restoring said setting means to normal position immediately after the actuation thereof, independently of the further motion of the keys.

135. The combination with a series of registering elements; separate setting means for the several registering elements; a series of keys for controlling the actuation of said setting means, means for restoring said setting means to normal position immediately after the actuation thereof, independently of the further motion of the keys; and operating means for the several registering elements, set in operation by said setting means.

136. The combination with a series of register wheels, of a group of keys adapted to be operated one at a time, controlling means for the several register wheels adapted to be operated one after another upon successive operations of the keys, said controlling means being timed to operate within the time required for a single operation of a key; and operating means for the register wheels, said operating means being set in operation by said setting means and so timed that the operation of any register wheel may occupy a greater time than that occupied by a single depression of a key.

137. The combination with a typewriting mechanism including a series of figure keys, of an adding mechanism including a series of adding wheels; selecting means and limiting means for said adding wheels controlled by said figure keys; and rotating means for said adding wheels set in operation immediately upon the actuation of said selecting and limiting means; the construction and arrangement being such that upon the operation of any figure key the selecting and limiting means will operate within the time occupied in operating said key while the rotating means may occupy a much longer period of time.

138. The combination with a typewriting mechanism including a series of figure keys and a carriage, of an adding mechanism including a series of register wheels; selecting means and limiting means controlled by said figure keys, rotating means capable of being made operative by said figure keys; the construction and arrangement being such that upon the operation of any figure key the selecting and limiting means will operate within the time occupied in operating said key while the time occupied in rotating the wheel may be as slow as that occupied in replacing the carriage of the typewriter to the denominational point at which the key was formerly operated.

139. The combination of a register wheel, a figure key controlling said wheel, and means for limiting the time during which said key can be connected to said wheel.

140. The combination of a series of register wheels, a series of keys for controlling said register wheels, means whereby any key may be connected to any register wheel to control the same, and means for limiting the length of time during which a key can be connected to a wheel.

141. The combination of a series of frictionally driven register wheels, a series of settable digit determining members carried by each of said register wheels, means for setting said digit determining members, including a series of electro-magnets; and means for controlling the circuits of said electro-magnets.

142. The combination of a series of frictionally driven register wheels, a series of settable digit determining members carried by each of said register wheels, and a group of keys and a carriage for controlling said settable digit determining members.

143. The combination of a series of frictionally driven register wheels, a series of settable digit determining members carried by each of said register wheels, and setting means for said digit determining members controlled by the keys and carriage of a typewriting machine.

144. The combination of a series of frictionally driven register wheels; a series of digit determining members carried by each of said register wheels; means including a series of reciprocatory bars for setting said digit determining members; a group of keys for controlling said bars, and denomination selecting means controlled by a carriage.

145. The combination of a series of frictionally driven register wheels; settable digit determining members carried by each of said register wheels; selective means for setting said digit determining members, and typewriting mechanism adapted to control said setting means.

146. The combination with a series of register wheels each carrying a series of digit determining members, of means including a series of reciprocatory bars for setting said digit determining members; a group of keys for controlling said bars; and means whereby, upon the depression of a key, at least one of said bars is operated and returned to normal position whether the key is immediately returned to normal position or not.

147. The combination of driving means, a series of register wheels each independently frictionally connected to said driving means and an electric motor for said driving means.

148. The combination of a continuously rotative driver, a series of register wheels each having independent connection with said driver, and an electric motor for rotating said driver.

149. The combination of a rotative shaft, a series of register wheels mounted on said shaft and having independent frictional connection therewith, and an electric motor for rotating said shaft.

150. The combination of a continuously rotative driver, a series of register wheels mounted thereon, and an electric motor for rotating said driver.

151. The combination of a series of register wheels, a series of digit determining members for each of said register wheels, a series of electro-magnets, the electric circuits of which are controlled by a group of keys and a carriage and which are adapted to set a digit determining member of a denomination determined by the carriage and of a numerical value determined by the key depressed.

152. The combination of a series of register wheels, a series of digit determining members for each of said register wheels, setting devices for the several digit determining members, and means for actuating a single setting device, a group of keys and a carriage; a series of said setting devices being controlled by each key and all of said setting devices being controlled by the carriage.

153. The combination of a series of register wheels, a series of digit determining members for each register wheel, digit-selecting electro-magnets and denomination selecting electro-magnets adapted to set said digit determining members, and a series of keys adapted to control said electro-magnets.

154. The combination of a series of register wheels, a series of digit determining members for each register wheel, two series of electro-magnets, and means whereby any selected digit determining member may be set by the combined action of electro-magnets of both series.

155. The combination of a series of register wheels, a series of digit determining members for each register wheel; digit-selecting electro magnets and denomination-selecting electro magnets; and setting members for said digit determining members controlled by said digit-selecting and denomination-selecting electro magnets.

156. The combination of a series of registering elements arranged to add numbers in different denominations; a series of frames one for each denomination; a series of frames one for each digit; register controlling means set by the joint action of a denomination frame and a digit frame; electro magnets controlling said frames; and a series of keys for controlling the circuits of said electro magnets.

157. The combination with registering elements, of digit determining members; electro magnets; means whereby any of said digit determining members may be operated by the joint action of a plurality of said electro magnets; and keys for controlling the circuits of said electro magnets.

158. The combination with a group of keys and printing devices actuated thereby, of means for automatically adding numbers printed by said keys in a plurality of denominations, said means comprising register wheels; setting devices actuated simultaneously with the depression of the keys entirely by power independent of that applied to the keys; and means adapted to rotate said register wheels after the depression of the keys.

159. The combination with a series of register wheels and devices for controlling said register wheels to add numbers thereon, of a group of keys common to all of said register wheels; means for setting said controlling devices one at a time as the several keys are depressed, said setting means being actuated entirely by a power independent of that applied to the keys; and means for rotating said register wheels, said means being adapted to act at least in part after said keys have returned to normal position.

160. The combination with typewriting mechanism comprising a group of numeral keys and a carriage, of a series of register wheels for automatically adding numbers written by said numeral keys; digit determining means for the several register wheels; power actuated means controlled selectively by the keys and carriage as said keys are depressed one at a time to set said digit determining members; and operating means for said register wheels adapted to operate at least in part after the numeral keys have been actuated and have been returned to normal position.

161. The combination with typewriting mechanism comprising numeral keys and a carriage, of adding mechanism for automatically adding numbers printed by said typewriting mechanism, said adding mechanism comprising register wheels, controlling devices for said register wheels, said controlling devices being actuated entirely by a power independent of that applied to the figure keys; means controlled by the keys and carriage for setting said controlling devices one at a time as the keys are operated; and rotating means for said register wheels adapted to rotate said wheels at least in part after said keys have been operated and have returned to normal position.

162. The combination with typewriting mechanism including numeral keys and a carriage, of adding mechanism for automatically adding numbers written in a plurality of denominations by said typewriting mechanism, said adding mechanism including a series of settable digit determining members for each denomination, and electro magnets for actuating said digit determining members selectively, the circuits of said electro magnets being controlled by said keys and carriage.

163. The combination with typewriting mechanism including a group of numeral keys and a carriage, of a series of adding wheels for automatically adding numbers printed by said typewriting mechanism and including setting means, electro magnets controlled by said keys and carriage and operating said setting means one at a time as the keys are depressed; and rotating means for said register wheels operating to rotate said wheels at least in part after the actuation of said keys.

164. The combination of a series of register wheels; means for controlling the rotation of said register wheels; electro magnets for actuating said controlling means; a group of keys for controlling said electro magnets; and means independent of the keys for rotating said wheels.

165. The combination with a series of register wheels, each carrying a series of settable digit determining members, of a group of numeral keys, a series of reciprocatory digit selecting bars and denomination selecting means co-operating with said bars; the construction and arrangement being such that upon the depression of any key the corresponding reciprocatory bar may operate its appropriate digit determining member in any selected register wheel.

166. The combination of a series of register wheels, each carrying settable digit determining members, a series of reciprocatory digit selecting bars, a series of keys and denomination selecting means; the construction and arrangement being such that upon the depression of any key the digit determining members of a value corresponding to the key depressed will be operated in the wheel determined by the denomination selecting devices.

167. The combination of a series of register wheels carrying a plurality of settable stops, and a plurality of sources of power to control said stops less in number than said stops.

168. The combination of a series of register wheels carrying a plurality of differential settable means, a plurality of sources of power for operating said settable means, and a group of keys controlling said sources of power less in number than said settable means.

169. The combination of a series of register wheels, a carriage, an electrical controller for said wheels controlled by said carriage and having a plurality of controlling contact points, a series of figure keys also controlling said wheels, and a series of limiting devices greater in number than said controlling points and said keys.

170. The combination of a series of register wheels, an electrical controller having a plurality of controlling contact points, a series of figure keys, and a series of limiting devices for said wheels controlled by said keys and differing in number from said controlling points and keys.

171. The combination of a series of register wheels, a series of digit determining means carried by each of said register wheels, actuating devices for said digit determining means, means whereby the depression of any key causes the operation of a plurality of said actuating devices.

172. The combination of a series of register wheels; a group of keys common to all of said register wheels; digit determining means for said register wheels; actuating means for said digit determining means; and means whereby the depression of any key results in the actuation of one of said digit determining means by the simultaneous operation of a plurality of said actuating means.

173. The combination with a series of register wheels, a series of actuating devices, a series of digit determining means for each of said register wheels, and means whereby any of said digit determining means may be actuated by the combined operation of a plurality of said actuating means.

174. The combination of a series of registering elements in combination with denomination selecting means, digit selecting means, and a setting member operated by both of said selecting means acting simultaneously.

175. The combination of denomination selecting mechanism; digit selecting mechanism; and setting members; certain of said setting members being partially operated by said denomination selecting mechanism, certain of said setting members being partially operated by said digit selecting mechanism, and one of said setting members being fully operated by the combined action of both of said selecting mechanisms.

176. In an adding device, the combination of a denomination selector, a digit selector and a setting member arranged to be fully operated by the simultaneous actuation of both of said selectors.

177. In an adding device, the combination of a group of keys, a denomination selector and a digit selector controlled by said keys, and a setting member arranged to be fully operated by the action of both selectors.

178. In an adding device, the combination with a group of keys and a carriage, of a digit selector and a denomination selector controlled by said keys and carriage, and a setting member arranged to be fully operated by the simultaneous actuation of both of said selectors.

179. In an adding device, the combination of a group of keys and printing means operatively connected thereto; a denomination selector and a digit selector controlled by said keys; and a setting member arranged to be fully operated by the simultaneous actuation of both of said selectors.

180. In an adding device, the combination of a group of keys; printing means operatively connected thereto; a carriage a denomination selector and a digit selector centrolled by said keys and carriage, and a setting member fully operated by the simultaneous actuation of both of said selectors.

181. In an adding device, the combination of a series of setting members, a denomination selector, and digit selectors, the construction and arrangement being such that any setting member may be fully operated by the simultaneous actuation of the denomination selector and a digit selector.

182. In an adding device, the combination of denomination selectors; digit selectors; and a plurality of series of setting members any one of which may be fully operated by the joint simultaneous actuation of a denomination selector and a digit selector.

183. The combination of denomination selectors, digit selectors, a plurality of series of setting members any one of which may be fully operated by the simultaneous actuation of a denomination selector and a digit selector, and a series of keys adapted to control said selectors.

184. The combination of denomination selectors, digit selectors, a plurality of series of setting members any one of which may be fully operated by the simultaneous actuation of a denomination selector and a digit selector; and a series of keys and a carriage adapted to control said selectors.

185. The combination of denomination selectors; digit selectors; a plurality of series of setting members any one of which may be fully operated by the simultaneous actuation of a denomination selector and a digit selector; a series of keys adapted to control said selectors; and printing means operatively connected to said keys.

186. The combination of denomination selectors; digit selectors; and a plurality of series of setting members any one of which may be fully operated by the simultaneous actuation of a denomination selector and a digit selector; said selectors being controlled by the keys and carriage of a typewriting machine.

187. The combination of a series of registering elements, a series of digit determining means for each of said registering elements, digit setting means for each of said determining means, a denomination selector partially operating certain of said setting means, a digit selector partially operating certain of said setting means, one of said setting means being fully operated by the joint action of both of said selectors.

188. The combination with registering elements, of a setting lever pivoted at two points, and means for oscillating said lever about either of its pivots.

189. The combination with a series of registering elements, of a setting lever pivoted at two points, and means for moving either of said pivots to oscillate said lever about the other pivot.

190. The combination with a series of registering elements, of a setting lever pivoted at two points, and means for moving both of said pivotal points to give said lever an operating movement greater than would be caused by the movement of either pivotal point alone.

191. The combination with registering elements, of a setting lever pivoted at two points, and means for moving either of said pivots to impart to said lever a partial oscillation about the other pivot as a fulcrum or to move both of said pivots to impart to said lever a full oscillation.

192. The combination with a series of registering elements, of a series of setting levers each pivoted at two points, means for moving certain of said levers about one of their pivots, means for moving certain of said levers about the other of their pivots, one of said levers being moved about both of its pivots.

193. The combination of a shaft; a series of adding wheels mounted thereon; a series of bars arranged parallel to said shaft and having setting levers pivoted thereto; a series of bails, one for each wheel, extending across said series of bars, and engaging the ends of said levers; means for reciprocating said bars to determine the digit to be added; and means for oscillating said bails to determine the denomination.

194. The combination with a series of registering elements arranged to add digits in different denominations; a series of frames one for each denomination; a series of frames one for each digit; and register controlling means set by the simultaneous actuation of a denomination frame and a digit frame.

195. The combination with a series of register wheels, of denomination selecting mechanism comprising a series of oscillating frames one for each wheel; digit selecting mechanism comprising a series of reciprocating bars one for each digit; and setting levers controlled by said frames and bars.

196. The combination with a series of register wheels, of a series of setting levers for each of said wheels; a denomination selector for giving all of the levers of the series a partial oscillation; and means for imparting to one of said levers an additional extent of oscillation.

197. The combination with a typewriting mechanism, of a series of register wheels normally tending to turn; settable stops for said wheels; and means controlled by the typewriting mechanism for resetting one stop to release a wheel and setting another stop to limit the motion of the wheel.

198. The combination of a series of register wheels; digit selecting devices and denomination selecting devices for controlling said wheels; and wheel releasing members operated by said denomination selecting devices.

199. The combination with adding mechanism; an electric motor for operating said mechanism; and electric circuits for controlling said mechanism, of a circuit controller for breaking said motor circuit and said controlling circuits simultaneously.

200. The combination with typewriting mechanism, of mechanism for automatically adding numbers printed in a column by said typewriting mechanism, said adding mechanism having digit determining means for each denomination; electrical connections between said typewriting mechanism and said digit determining means; and means for operatively disconnecting said typewriting mechanism from said digit determining means, whereby other numbers may be written in the same column with the numbers to be added without affecting said digit determining means.

201. The combination with typewriting mechanism, of a series of registering elements; digit determining means for each of said registering elements; setting devices for said digit determining means controlled by the keys of the typewriting mechanism; and means for operatively disconnecting said keys and said setting devices.

202. The combination with typewriting mechanism having numeral keys, and a case shift device, of a series of registering elements, digit determining means for each of said registering elements, and means adapted to be operated by said case shift device for operatively disconnecting said typewriting mechanism from said digit determining means.

203. The combination of typewriting mechanism, a series of frictionally driven registering elements and controlling means for said registering elements operatively connected to said typewriting mechanism, with provision for operatively disconnecting said typewriting mechanism from said controlling means.

204. The combination with a series of registering elements, a continuously rotative driver adapted to actuate said registering elements, and controlling means for said registering elements operatively connected to a typewriting mechanism, with provision for operatively disconnecting said controlling means from said typewriting mechanism.

205. The combination of a series of adding wheels; electric circuits arranged to control said wheels; a zero setting device for said wheels; and a circuit breaker connected to said zero setting device.

206. The combination of a series of keys; electric circuits controlled by said keys; adding wheels controlled by said electric circuits; and a zero setter for said wheels arranged to break said circuits.

207. The combination with a series of adding wheels; driving means for said adding wheels, and means for controlling the turning of said wheels by said driving means in the process of addition; of means for controlling the turning of said wheels by said driving means to cause them to be reset to zero and arranged also to render said addition wheel controlling means inoperative.

208. The combination of a series of adding wheels; driving means for said wheels; means for controlling the turning of said wheels by said driving means to add numbers; means for controlling the turning of said wheels by said driving means to reset said wheels to zero; and an alarm arranged to indicate when the zero setting operation is complete.

209. The combination of a series of keys and adding devices controlled by said keys; means arranged to control the connection between said adding devices and said keys; and an alarm connected to said connection controlling means.

210. The combination of a series of adding wheels; means for actuating said wheels; settable digit determining members for each of said wheels for determining the limit of motion thereof in the operation of addition; and zero setting means adapted to set the proper digit determining member of each wheel automatically to cause all of the wheels to assume their zero positions.

211. The combination of a series of normally idle adding wheels; continuously operative driving means for said wheels; and zero setting means arranged to afford to said wheels movement under the impulse of said driving means and to arrest the movement of said wheels at zero position.

212. The combination of a series of register wheels, a continuously rotative driver for said register wheels, and means for controlling the rotation of said register wheels under the impulse of said driver to set said register wheels to zero.

213. The combination of a series of register wheels, settable digit determining means carried by said wheels, means by which said wheels may be operated to add numbers; and means for automatically setting said wheels to zero.

214. The combination of a series of register wheels, settable digit determining members carried by said wheels and zero setting devices co-operating with said digit determining members.

215. The combination of a series of register wheels; driving means for said register wheels having frictional connection therewith, means for controlling the rotation of said register wheels under the impulse of said driving means to add numbers; and means for controlling the rotation of said register wheels under the impulse of said frictional connection to set said register wheels to zero.

216. An adding wheel mounted on a rotary shaft and having frictional connection therewith; in combination with means adapted to automatically afford to said wheel a freedom of motion with said shaft and to arrest said wheel at its zero position.

217. The combination of a series of adding wheels mounted on a rotary shaft and having frictional connection therewith; and means co-operating with all of said wheels and adapted to afford to said wheels a freedom of motion with said shaft and to arrest said wheels in their zero positions.

218. The combination with a series of register wheels and driving means therefor, of zero setting mechanism comprising arresting means movable to position to arrest said register wheels, means for holding said arresting means in operative position, and means for releasing said arresting means.

219. The combination of a series of register wheels and a rotative driver therefor, of zero setting mechanism comprising arresting means movable to position to arrest said register wheels and means operated by said driver to automatically restore said arresting means after all of the register wheels have been arrested.

220. The combination with register wheels and driving means therefor, of zero setting mechanism comprising a hand operated member, means for holding said hand operated member in operative position, and means controlled by said driving means for automatically releasing said hand operated member.

221. The combination of a series of register wheels; settable digit determining members carried by said register wheels; and means for simultaneously restoring to inoperative position all of said digit determining members which are in operative position.

222. The combination of a series of register wheels, settable digit determining members carried by said register wheels, one of said digit determining members being normally in position to arrest said wheels; and means for simultaneously restoring all of said digit determining members which are in arresting position to release the wheels.

223. The combination of a series of register wheels, settable stops carried by said register wheels, means co-operating with each wheel to reset that stop which is in operative position in the operation of addition; and means for simultaneously operating all of said resetting means.

224. The combination of a series of register wheels; settable digit determining members carried by said register wheels; means for operating said settable digit determining members; and means for restoring any of said digit determining members that may have become accidentally displaced.

225. The combination of a series of register wheels, settable digit determining members carried by said register wheels, and zero setting mechanism comprising means for restoring any of said digit determining members that may have become accidentally displaced.

226. The combination with a series of register wheels, and a rotary driver therefor, of zero setting mechanism for said register wheels, a lever 385, the depression of which brings said zero setting mechanism into operation, a latch 408 for holding said lever 385 in depressed position, a worm 420 connected to said rotary driver, and means operated by said worm for tripping said latch.

227. The combination of a series of register wheels; means for controlling said register wheels to add numbers; means for resetting said register wheels to zero; means for rendering said controlling means inoperative during the zero setting operation; and means for rendering said controlling means again operative and sounding an alarm when the zero setting operation is complete.

228. The combination with a series of register wheels, of differential controlling devices for said register wheels, keys controlling said differential devices, zero setting means for said register wheels, means whereby said zero setting means disconnect said keys from said differential devices, means for holding said zero setting means in operative position, and means for automatically releasing said zero setting means and restoring the connection between said keys and differential devices.

229. The combination with a series of register wheels, driving means therefor, and electric circuits for controlling said register wheels, of zero setting mechanism, a circuit controller for said electrical circuits operative by said zero setting mechanism, means for holding said circuit controller in inoperative position, and means for automatically restoring it to normal position.

230. The combination of an adding mechanism and zero setting means therefor, of a typewriting mechanism adapted to control said adding mechanism, and means for rendering said adding mechanism inoperative in connection with the typewriting mechanism during the zero setting operation.

231. The combination with adding mechanism and zero setting devices therefor, of a series of keys adapted to control said adding mechanism, and means for operatively disconnecting said keys from said adding mechanism during the zero setting operation.

232. The combination with a series of register wheels, of digit selecting devices and denomination selecting devices for controlling the rotation of said register wheels, of zero setting devices and means for rendering said denomination selecting devices and digit selecting devices inoperative during the zero setting operation.

233. The combination of register wheels, settable digit determining members carried thereby and spring pressed devices for automatically setting the proper digit determining member to bring the register wheel to zero position.

234. The combination with registering devices, of electric circuits for controlling the same, a rotary shaft for actuating said registering devices, a worm connected to said rotary shaft, a circuit controller for said electric circuits, means for operating said circuit controller, and means co-operating with said worm to control the restoration of said circuit controller.

235. The combination of a series of register wheels carrying settable digit determining members, spring pressed devices for operating the appropriate member in each wheel to set said wheel to zero, and means carried by said wheel for determining which of said members shall be operated.

236. The combination of a register wheel, settable digit determining members carried by said register wheel, and means controlled by said register wheel for setting the appropriate digit determining member to bring the register wheel to zero position.

237. The combination of an adding wheel carrying settable digit determining members; a setting device for said members tending to operate; means carried by the wheel to prevent said operation except on that digit determining device which is adapted to set the register wheel to zero.

238. The combination of a series of rotatable register wheels, differential devices for controlling the rotation of said wheels to add numbers, and means for automatically controlling said differential devices to set the wheels to zero.

239. The combination of a series of register wheels, driving means therefor, and a zero setting mechanism comprising means for temporarily arresting and alining said wheels, and means for automatically freeing said wheels from said arresting means.

240. The combination with a series of register wheels and driving means therefor, of zero setting mechanism comprising means for releasing the register wheels, means for arresting the register wheels; and means for automatically releasing the wheels from said arresting means.

241. The combination with a series of register wheels and driving means therefor, of zero setting mechanism comprising means for releasing said register wheels, means for temporarily arresting said register wheels, and means for arresting said register wheels at zero.

242. The combination with a series of register wheels having settable digit determining members and driving means for said register wheels, of zero setting mechanism comprising means for setting the proper digit determining members and temporarily arresting said register wheels.

243. The combination of a registering wheel carrying a series of settable members, driving means for said wheel, zero setting devices including means for automatically selecting one of the settable members, and means co-operating with said selected settable member to set the next succeeding settable member to arrest said wheel at zero.

244. The combination with a series of register wheels each carrying a series of settable members, and driving means for said wheels and transfer devices, of a zero setting device including means for selecting a settable member in each wheel with provision for actuating the next succeeding settable member in each dial except that of the lowest denomination.

245. The combination with a group of keys and printing means actuated thereby, of adding mechanism; electric circuits for controlling said adding mechanism; circuit controllers actuated by said keys; and means for disconnecting said circuit controllers from said keys.

246. The combination with a group of keys, and printing means actuated thereby, of adding mechanism; electric circuits for controlling said adding mechanism; circuit controllers for said electrical circuits; and hook arms connecting said circuit controllers to said keys.

247. The combination with a typewriter mechanism including numeral keys and a movable carriage, of a tabulator to control the movement of the carriage, said tabulator including an adjustable tappet, adding mechanism adapted to automatically add numbers printed by said typewriting mechanism and a controller adapted to be adjustably mounted on a portion of said typewriting machine and adjustable co-operatively with said tappet.

248. The combination with a series of adding wheels, of a typewriting machine having a carriage and a framework, a controller for said adding wheels comprising two members, one of which is adjustably connected to the carriage of a typewriting machine, and the other of which is adjustably connected to the framework of said typewriting machine.

249. In an adding attachment for a typewriting machine, the combination of a typewriting machine having a framework, a holding member adapted to be adjustably mounted on the framework of said typewriting machine, and a controller member adapted to be detachably retained in position by said holding member.

250. In a combined typewriting and adding device, the combination of an electrical controller for said adding device comprising a block of insulating material having contact 251. In a combined typewriting and adding device, the combination of a typewriting machine having a framework, a controller member connected to the framework of the typewriting machine, and a shoe co-operating with said controller member and adjustably connected to the typewriter carriage.

252. The combination of a typewriting mechanism; a tabulating device co-operating therewith, said tabulating device having a tabulator scale; and an adding attachment for said typewriting mechanism including a controller, one member of which is adjustably mounted on said tabulator scale.

253. The combination of a typewriting mechanism; a tabulator therefor, said tabulator including a tabulator scale, an adding attachment for said typewriting mechanism including electric circuits; a controller for said electric circuits, one member of which is connected to the framework of the typewriting machine and the other member of which is connected to said tabulator scale and is adjustable lengthwise thereof, whereby contact between said controller members may be made at different predetermined portions of the travel of the typewriter carriage.

254. In an adding attachment for a typewriting machine, the combination of adding mechanism and electric circuits for controlling the same, of numeral keys; spring actuated circuit controllers; means connecting said circuit controllers to said keys; and an electromagnet and connections for automatically disconnecting said circuit controllers from said keys.

255. The combination of numeral keys; spring pressed circuit controllers; hook arms connected to said keys and adapted to operate said circuit controllers; an adding mechanism controlled by said circuit controllers; a movable frame adapted to disconnect said hook arms from said circuit controllers; and means controlled by said circuit controllers for actuating said movable frame.

256. The combination with figure keys, of adding mechanism; electric circuits for controlling said adding mechanism; circuit controllers for said electric circuits controlled by said keys; each of said circuit controllers including an adjustable spring pressed contact point, and a second adjustable spring pressed contact point adapted to be operated by a key.

257. The combination of a series of adding wheels; typewriting mechanism including a movable carriage; a controller co-operating with said carriage and having a plurality of controller points; electric circuits controlled by said controller and controlling said adding wheels; and a switchboard and switch for varying the connection between said controller point and said adding wheels, said switch comprising a series of insulated contacts mounted on a pivoted arm.

258. The combination of a series of adding wheels; typewriting mechanism including a movable carriage; a controller co-operating with said carriage and having a plurality of controller points; electric circuits controlled by said controller and controlling said adding wheels; and a switchboard and switch for varying the connection between said controller points and said adding wheels; said switch comprising a series of insulated contacts mounted on a pivoted arm, a lug on said arm, and retaining notches co-operating with said lug, said spring contacts being adapted to press said lug into one of said notches.

259. The combination of a series of adding wheels; typewriting mechanism including a movable carriage; a controller co-operating with said carriage and having a plurality of controller points; electric circuits controlled by said controller and controlling said adding wheels; and a switchboard and switch for varying the connection between said controller points and said adding wheels, said switch comprising a series of insulated contacts mounted on a pivoted arm, a handle for moving said switch, and means for indicating the character of connections corresponding to each position of the switch.

260. The combination with a series of adding wheels, of a typewriter carriage; a controller for said adding wheels governed by said typewriter carriage, said controller having a plurality of controlling points; means for varying the connection between the several controller points and the several register wheels; a tabulator co-operating with the carriage, and an adjustable indicator co-operating with said tabulator to indicate the several characters of connection between the controller points and the register wheels.

261. The combination with a series of register wheels, a typewriter carriage, and a series of typewriter keys adapted to control said register wheels, the construction being such that numbers written by said typewriter keys are automatically added on said register wheels; means for varying the connection between said typewriter carriage and said register wheels to vary the spacing of the printing; a tabulator adapted to set the carriage at any one of a series of letter space positions; and an adjustable indicator for indicating the various denominational values of the adding wheels, operable at the various letter space positions according to the character of connection used between said typewriter and adding wheels.

262. The combination with a typewriter and a series of adding wheels, of a tabulator for said typewriter, a controller operatively connected to and adapted to be set by said tabulator, means for varying the connection between said controller and said adding wheels, a group of denominational tabulator keys, and an adjustable indicator for indicating the different denominational values of said tabulator keys according to the character of the connection between said controller and said adding wheels.

263. The combination of a series of registering elements, differential devices carried by each of said registering elements; a typewriting mechanism having numeral keys and a carriage; and connections whereby said keys and carriage may control said differential devices selectively, said connections being changeable to vary the spacing of the printing.

264. The combination of register wheels, differential devices carried by each of said register wheels, a typewriting mechanism having numeral keys and a carriage, connections whereby said keys and carriage may control said differential devices selectively, and means for changing said connections to vary the spacing of the printing.

265. The combination with a series of register wheels, each carrying a series of settable digit determining means, of a movable frame comprising a series of plates 256 for returning to normal position any of said settable digit determining members which may have become displaced.

266. The combination with the register wheels 10 each carrying the settable pieces 16, of a movable frame having plates 256 adapted to set said pins, hand operated means for moving said frame, and zero setting means also adapted to move said frame.

267. The combination of the register wheels 10 arranged side by side along the axis, and each having the settable members 16 of the levers 106 between said register wheels, the frame bar 108 to which said levers are pivotally connected, the stops 18 on said levers co-operating with said settable members, means for displacing said levers and cams 118 by which said pins replace said settable members.

268. The combination of a series of register wheels having the settable members 16, the stops 18 co-operating with said settable members, levers 120 actuated by one of said settable members in the operation of transferring, and the levers 123 actuated by said levers 120 and adapted to set the next succeeding settable member.

269. The combination with a series of register wheels each carrying settable members 16, of zero setting devices including the reciprocatory bar 376, the spring actuated arms 400 pivoted to said bar, flanges 14 on said register wheels adapted to be engaged by said levers 400, and the notches 406 in said flanges whereby said levers 400 arrest said register wheels in alinement and set said settable members 16.

270. The combination of a series of register wheels, digit determining members for said wheels, a series of reciprocatory setting bars for said digit determining members, and means for adjustably limiting the movement of said bars.

271. The combination of a series of register wheels, movable denomination selecting frames for said register wheels, and adjustable means for limiting the movement of said frames.

272. The combination of register wheels, digit determining members for said register wheels, setting devices for said digit determining members, and electro magnets for actuating said setting devices, the armatures of said electro magnets being adjustably connected to said setting devices.

273. The combination of a pair of register wheels, each carrying settable digit determining members, transfer devices having a movable part adapted to set said digit determining members, and means for adjustably limiting the movement of said movable part.

Signed at the borough of Manhattan, city of New York, in the county of New York, and State of New York, this 30th day of September, A. D. 1903.

ALBERT H. ELLIS.

Witnesses:
K. V. DONOVAN,
E. M. WELLS.